US012366767B2

(12) United States Patent
Nankivil et al.

(10) Patent No.: US 12,366,767 B2
(45) Date of Patent: Jul. 22, 2025

(54) MULTI-LENS SYSTEM FOR PRESBYOPIA

(71) Applicant: Johnson & Johnson Vision Care, Inc., Jacksonville, FL (US)

(72) Inventors: Derek Dean Nankivil, Jacksonville, FL (US); Benjamin Wooley, Jacksonville, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 819 days.

(21) Appl. No.: 16/854,058

(22) Filed: Apr. 21, 2020

(65) Prior Publication Data
US 2021/0325694 A1 Oct. 21, 2021

(51) Int. Cl.
*G02C 7/02* (2006.01)
*G02C 7/04* (2006.01)

(52) U.S. Cl.
CPC .............. *G02C 7/028* (2013.01); *G02C 7/041* (2013.01); *G02C 7/047* (2013.01)

(58) Field of Classification Search
CPC ......... G02C 7/028; G02C 7/041; G02C 7/047
USPC ..................................... 351/159.74
See application file for complete search history.

(56) References Cited

U.S. PATENT DOCUMENTS

| 5,296,881 A | 3/1994 | Freeman |
| 5,835,192 A | 11/1998 | Roffman |
| 8,393,733 B2 | 3/2013 | Wooley et al. |
| 8,992,012 B2 | 3/2015 | Wooley et al. |
| 9,952,449 B2 | 4/2018 | Goto et al. |
| 11,061,255 B2 | 7/2021 | Lau |
| 11,686,954 B2 | 6/2023 | Chen |
| 2009/0033864 A1 | 2/2009 | Shone |
| 2009/0244478 A1 | 10/2009 | Wooley et al. |
| 2010/0026958 A1 | 2/2010 | Wooley |

(Continued)

FOREIGN PATENT DOCUMENTS

| JP | 2016200612 | 12/2016 |
| WO | 9423327 A1 | 10/1994 |

(Continued)

OTHER PUBLICATIONS

International Search Report And Written Opinion received for Application No. PCT/IB2021/061962, mailed on Jun. 3, 2021, 10 pages.

*Primary Examiner* — Zachary W Wilkes

(57) ABSTRACT

Described herein are systems and/or methods for designing a system of contact lenses with interocular refractive disparity (i.e. anisometropia) for presbyopes. An example method may comprise a step of determining a plurality of lenses for inclusion in a system of contact lenses for treating presbyopes. Each of the plurality of lenses may be configured for an optical correction and may have a power profile associated therewith. The plurality of lenses may be grouped based on the optical correction. Each of the lenses in a particular group may have a different power profile. The example method may comprise a step of creating, based at least on the plurality of lenses and an add need, a fit guide. The fit guide may provide an interocular disparity of effective add. The interocular disparity of effective add may be determined by optimizing cyclopean performance across a range accommodative demands and light levels.

16 Claims, 39 Drawing Sheets

Example power profiles and fit guides for a lens system in accordance with the present disclosure

(56) References Cited

U.S. PATENT DOCUMENTS

| | | | |
|---|---|---|---|
| 2010/0079723 A1* | 4/2010 | Kingston | A61F 2/1613 |
| | | | 351/159.54 |
| 2012/0327363 A1 | 12/2012 | Wooley et al. | |
| 2013/0201443 A1 | 8/2013 | Back et al. | |
| 2014/0268034 A1 | 9/2014 | Wooley et al. | |
| 2015/0342453 A1* | 12/2015 | Chaouk | G02C 7/047 |
| | | | 351/246 |
| 2016/0062140 A1* | 3/2016 | Wooley | G02C 7/024 |
| | | | 623/6.11 |
| 2021/0165246 A1 | 6/2021 | Chang | |

FOREIGN PATENT DOCUMENTS

| | | |
|---|---|---|
| WO | 09072578 | 6/2009 |
| | 2009/072528 | |
| WO | 2009124052 A | 10/2009 |
| WO | 14128744 | 8/2014 |
| WO | 2021214584 A1 | 10/2021 |

\* cited by examiner

MULTI-LENS SYSTEM FOR PRESBYOPIA

BACKGROUND

In general, multifocal or extended depth of focus (EDOF) lenses significantly mitigate the effects of presbyopia, but they require performance trade-offs. Typically, peak distance vision is sacrificed to deliver improved near visual performance. Despite the outstanding visual performance of some of the market leading multifocal simultaneous vision lens systems (Multifocal (MF)), simulations suggest that there is opportunity to improve performance across a range of accommodative demands, particularly at the near.

SUMMARY

The present lenses, lens system, and methods provide a superior trade-off regarding overall visual performance across a range of accommodative demands over MF. This may be achieved by leveraging the capacity of the visual system to tolerate interocular refractive disparity (i.e. anisometropia) to further increase the cyclopean depth of focus (DOF). Alternatively, or in addition, differing from MF, this design employs more add power, more variation in design across stock keeping units (SKUs), where each SKU distinguishes a different prescription (Rx), and a visual performance manifold optimized fit/refit prescription (e.g., fitting guide).

Described herein are systems and/or methods for designing a system of contact lenses with anisometropia for presbyopes. An example method may comprise a step of determining a plurality of lens types for inclusion in a system of contact lenses for treating presbyopes. The lens system may comprise at least three lens types (lens A, a lens B, and a lens C designation). The lens types may vary by effective add or DOF, or both. Each of the plurality of lenses may be configured for an optical correction and may have a power profile associated therewith. The plurality of lenses may be grouped based on the optical correction. Each of the lenses of a particular type may have a different power profile. The optical correction normalized power profile across a range of optical corrections for each of the lens designations may be varied to improve performance considering: [1] Rx, age and accommodation dependence of ocular spherical aberration, and/or [2] Rx, age and luminance dependence of entrance pupil diameter. Other combinations of performance factors may be used and may include single, discrete factors. The example method may comprise a step of creating, based at least on the plurality of lenses and an add need, a fit guide indicating which of the plurality of lenses to be worn on the dominant eye and non-dominant eye. The fit guide may provide an interocular disparity of effective add.

Described herein are systems and/or methods for designing a system of contact lenses with anisometropia for presbyopes. An example method may comprise a step of determining a plurality of lenses for inclusion in a system of contact lenses for treating presbyopes. Each of the plurality of lenses may be configured for an optical correction and may have a power profile associated therewith. The plurality of lenses may be grouped based on the optical correction. Each of the lenses in a particular group may have a different power profile. The example method may comprise a step of creating, based at least on the plurality of lenses and an add need, a fit guide indicating which of the plurality of lenses to be worn on a dominant eye and a non-dominant eye. The fit guide may provide an interocular disparity of effective add.

Disclosed herein are methods and/or systems of contact lenses with anisometropia for presbyopes. An example system may comprise a plurality of lens types for treating presbyopes. The lens system may comprise at least three lens types (lens A, a lens B, and a lens C designation). Each of the plurality of lenses may be configured for an optical correction and may have a power profile associated therewith. The plurality of lenses may be grouped based on the optical correction. Each of the lenses of a particular type may have a different power profile. The optical correction normalized power profile across a range of optical corrections for each of the lens designations may be varied to improve performance considering [1] prescription (Rx), age and accommodation dependence of ocular spherical aberration, [2] Rx, age and luminance dependence of entrance pupil diameter. The example system may comprise a fit guide indicating which of the plurality of lenses to be worn on a dominant eye and a non-dominant eye. The fit guide provides an interocular disparity of effective add.

Described herein are systems and/or methods for customizing a system of contact lenses with anisometropia for presbyopes. An example method may comprise a step of determining (e.g., selecting) a fit (e.g., profile) associated with at least one user exhibiting presbyopia. The example method may comprise a step of selecting (e.g., simulating), based on the fit, one or more visual performance manifolds. Each of the visual performance manifolds may be generated based on lens designs, an eye model, and environmental conditions. The example method may comprise a step of selecting, based on one or more visual performance manifolds, a plurality of lenses for inclusion in a system of contact lenses for treating presbyopia or for alterations in lens fit given subjective feedback. Each of the plurality of lenses may be configured for an optical correction and may have a power profile associated therewith. The plurality of lenses may be grouped based on the optical correction. Each of the lenses in a particular group may have a different power profile. The example method may comprise a step of creating, based at least on the plurality of lenses and an add need, a fit guide indicating which of the plurality of lenses to be worn on a dominant eye and a non-dominant eye. The fit guide may provide an interocular disparity of effective add.

The plurality of lenses may be grouped based on the optical correction such that a lens group is associated with a specific optical correction level or designation such as between −20 D and +20 D. For example, a lens system may comprise a plurality of lenses grouped based on an optical correction of −6 D. However, there may be an add need of the user, and a fit guide may be used to select which of the lenses in the group/system should be worn on which eye of the user for preferred performance. Each lens group may comprise at least three center near continuous multifocal lenses. Each group of lenses may comprise three lenses. Each group of lenses may comprise four lenses. Each group of lenses may comprise five lenses.

BRIEF DESCRIPTION OF THE DRAWINGS

The following drawings show generally, by way of example, but not by way of limitation, various examples discussed in the present disclosure. In the drawings.

across various Add powers. The dashed line is a reference representing zero difference, below the line indicates a greater effective add for prior art lenses such as shown in FIG. 1 and above the line indicates a greater effective add for lenses in accordance to the present disclosure such as shown in FIG. 10.

Figure 1:
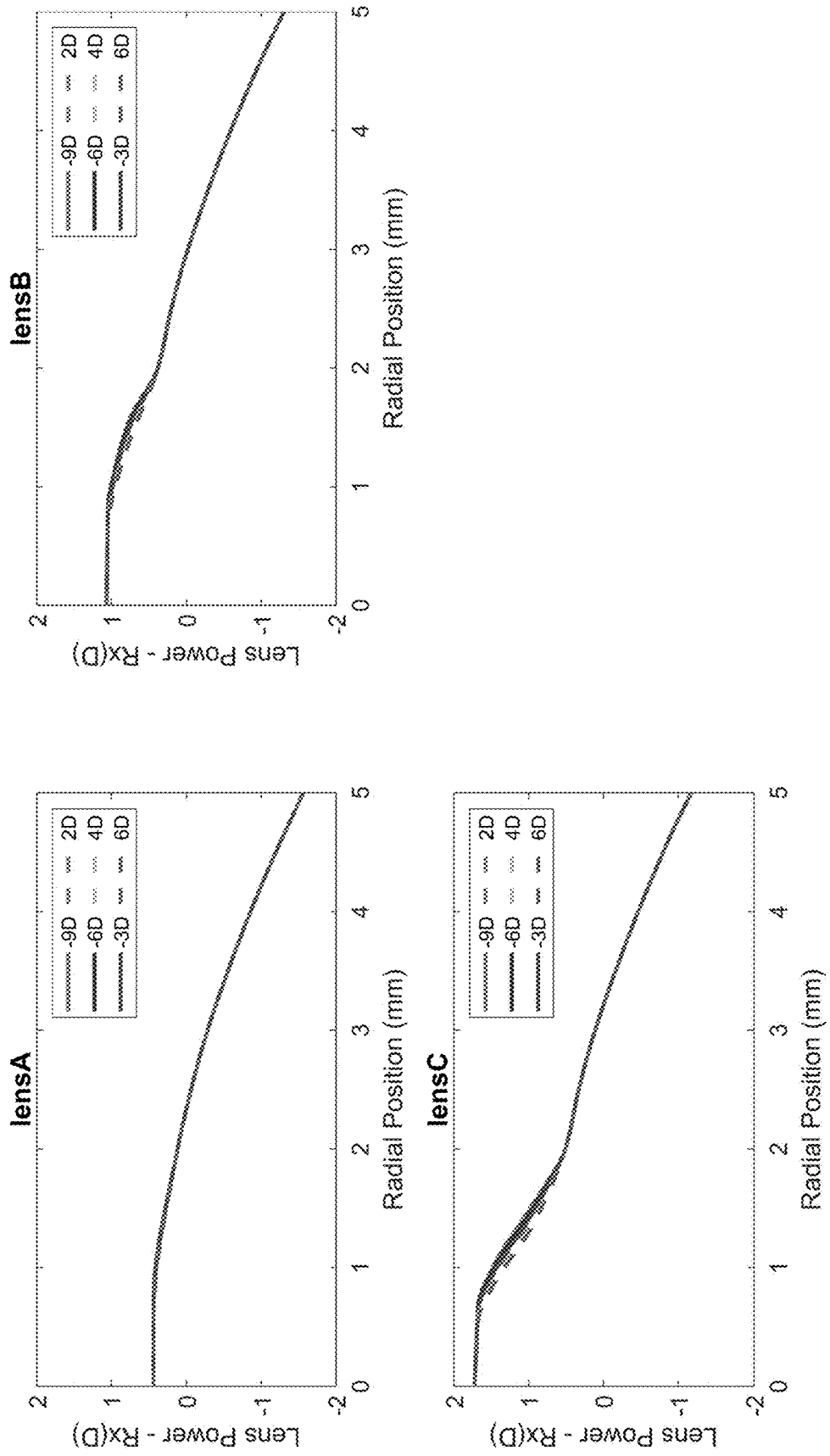
FIG. 1 shows example power profiles of a comparative three lens system.
Figure 2:
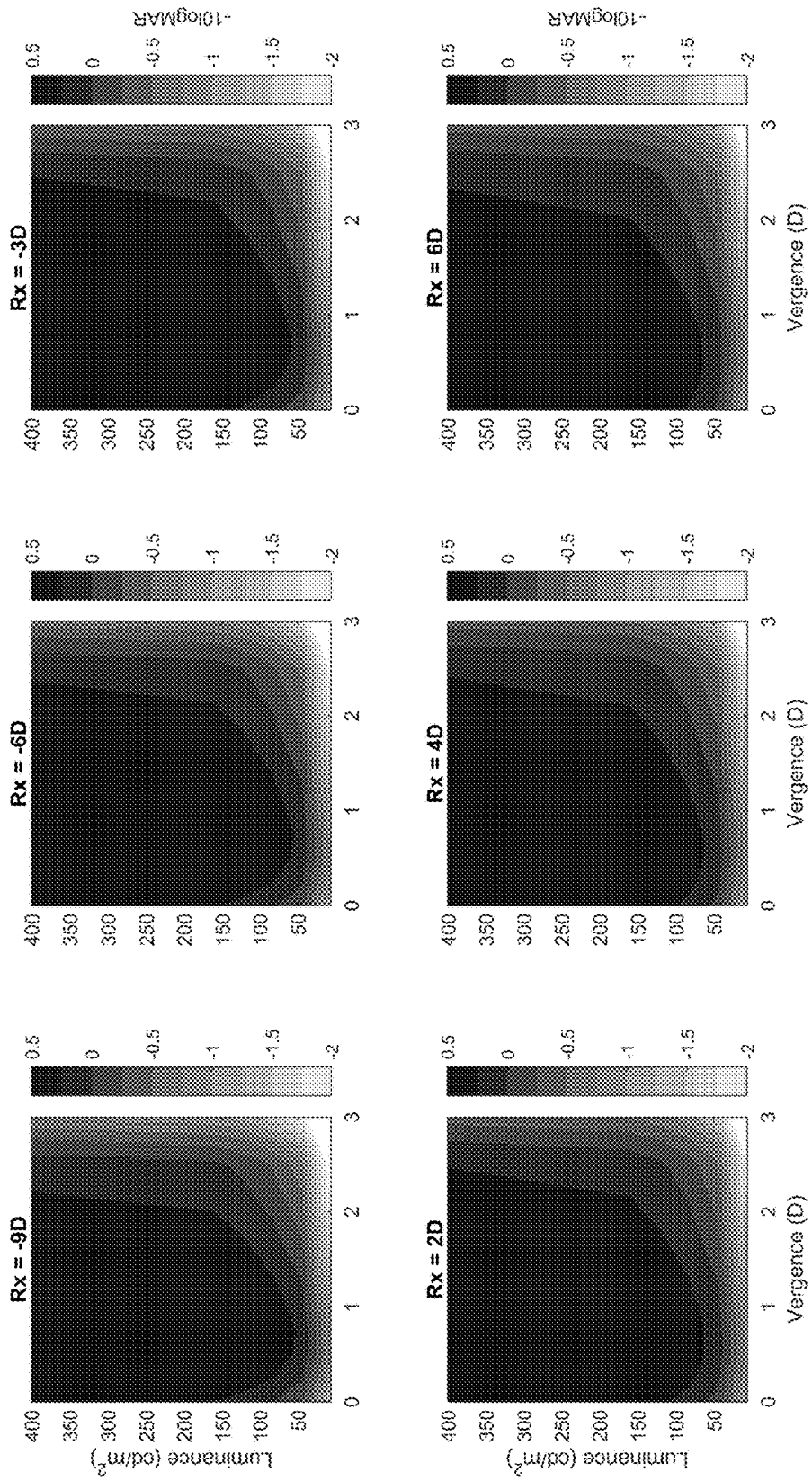
FIG. 2 shows example graphs of visual performance of a comparative lens system for various prescriptions (Rx) and an Add of 0.75 D.
Figure 3:
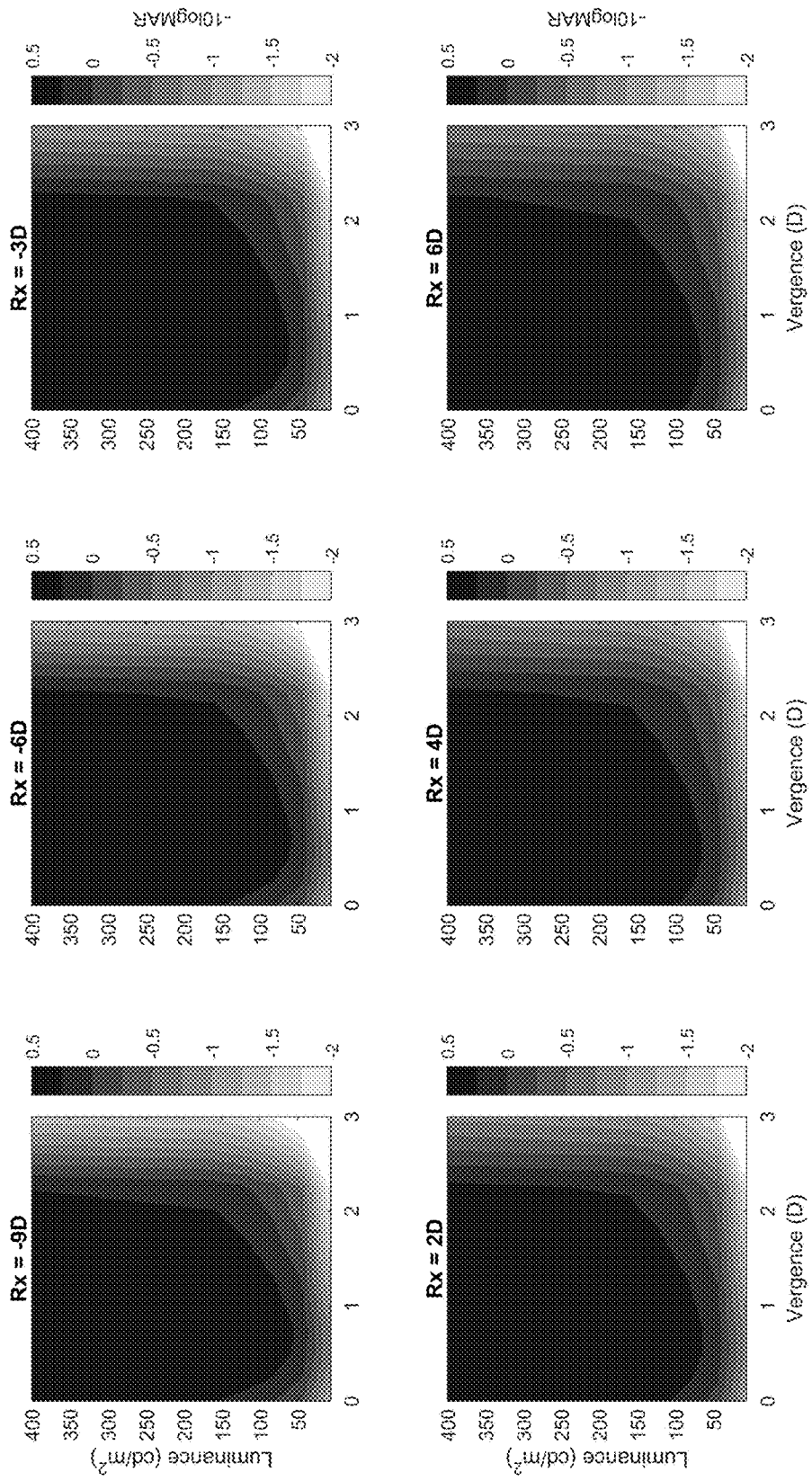
FIG. 3 shows example graphs of visual performance of a comparative lens system for various prescriptions (Rx) and an Add of 1.00 D.
Figure 4:
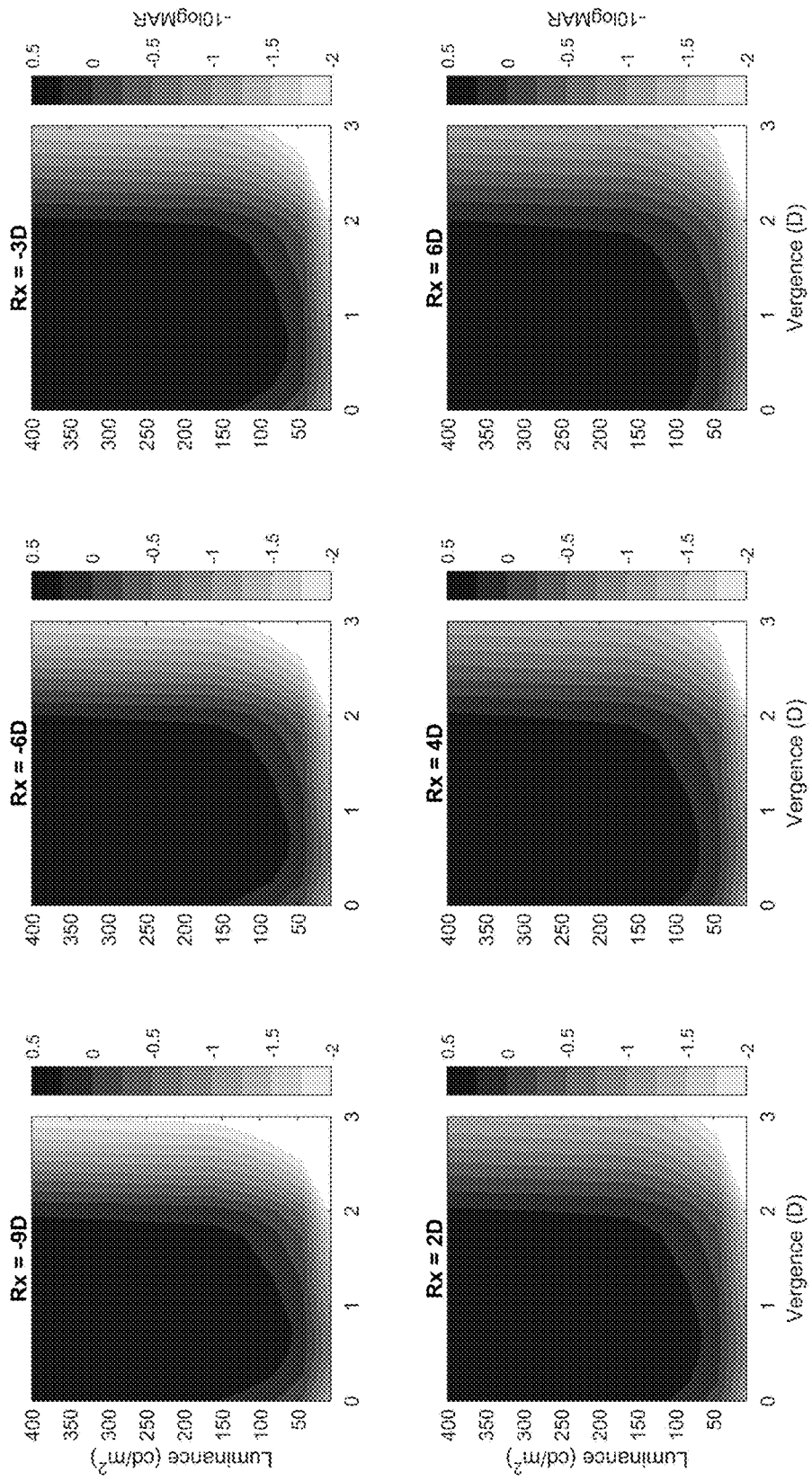
FIG. 4 shows example graphs of visual performance of a comparative lens system for various prescriptions (Rx) and an Add of 1.25 D.
Figure 5:
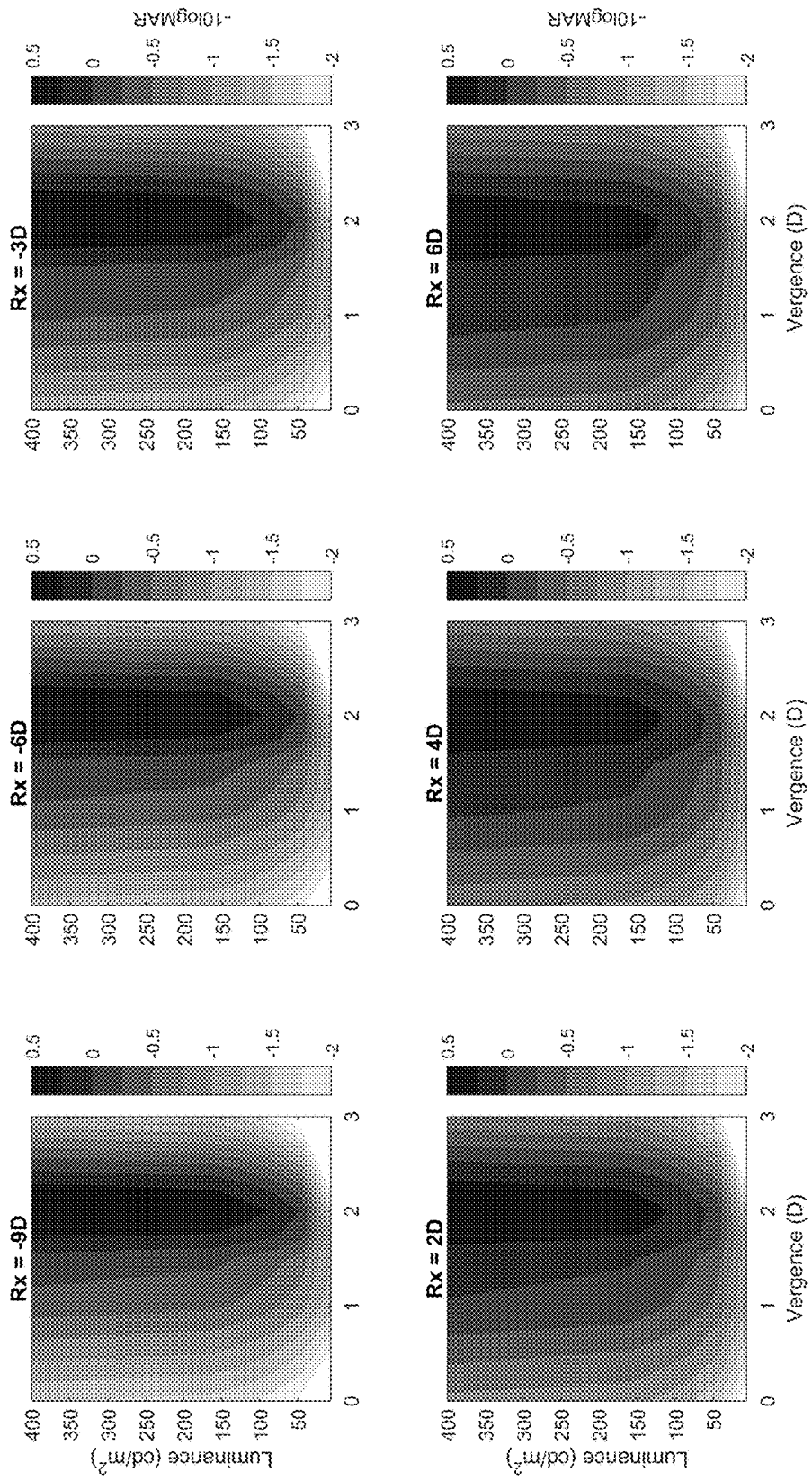
FIG. 5 shows example graphs of visual performance of a comparative lens system for various prescriptions (Rx) and an Add of 1.50 D.
Figure 6:
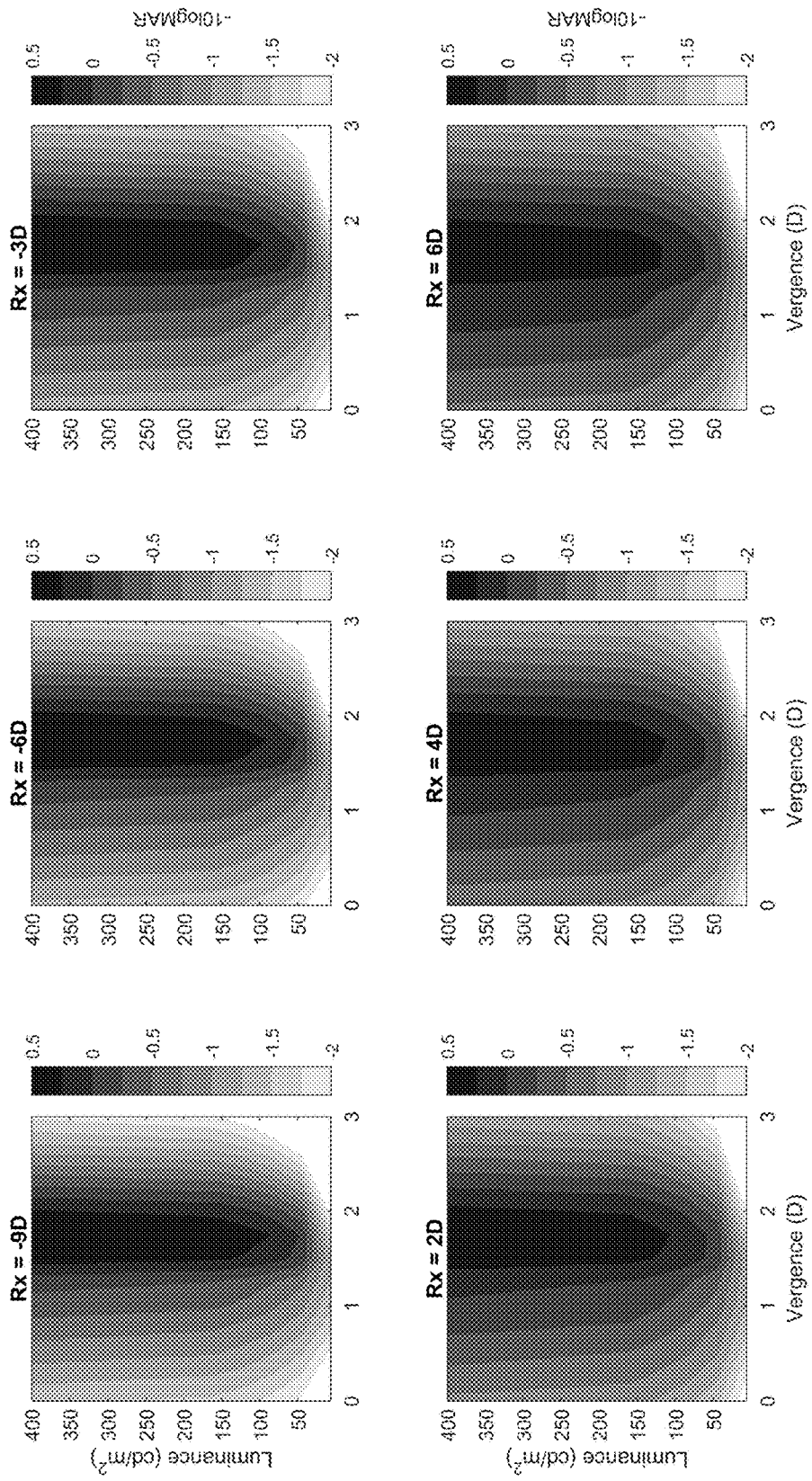
FIG. 6 shows example graphs of visual performance of a comparative lens system for various prescriptions (Rx) and an Add of 1.75 D.
Figure 7:
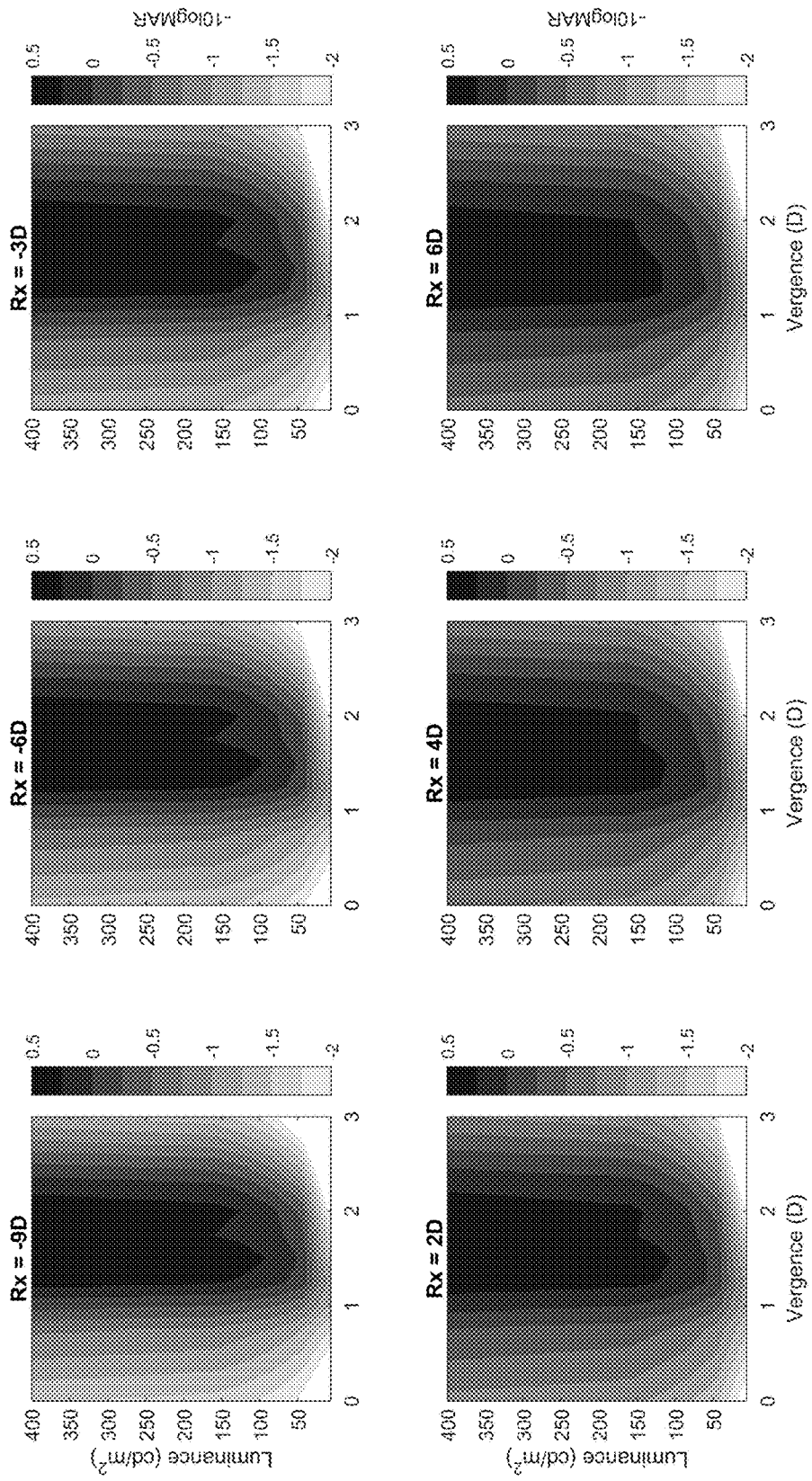
FIG. 7 shows example graphs of visual performance of a comparative lens system for various prescriptions (Rx) and an Add of 2.00 D.
Figure 8:
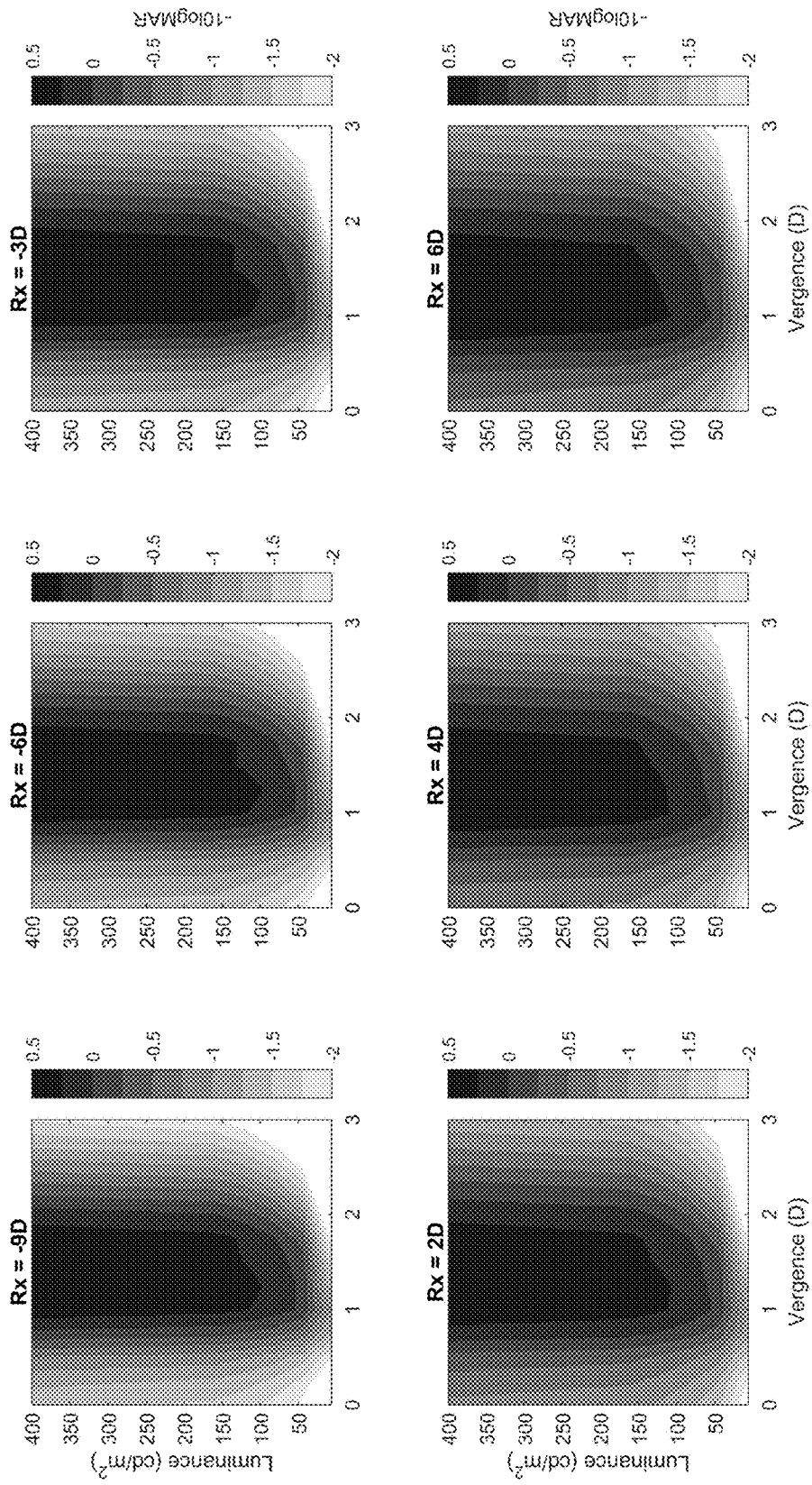
FIG. 8 shows example graphs of visual performance of a comparative lens system for various prescriptions (Rx) and an Add of 2.25 D.
Figure 9:
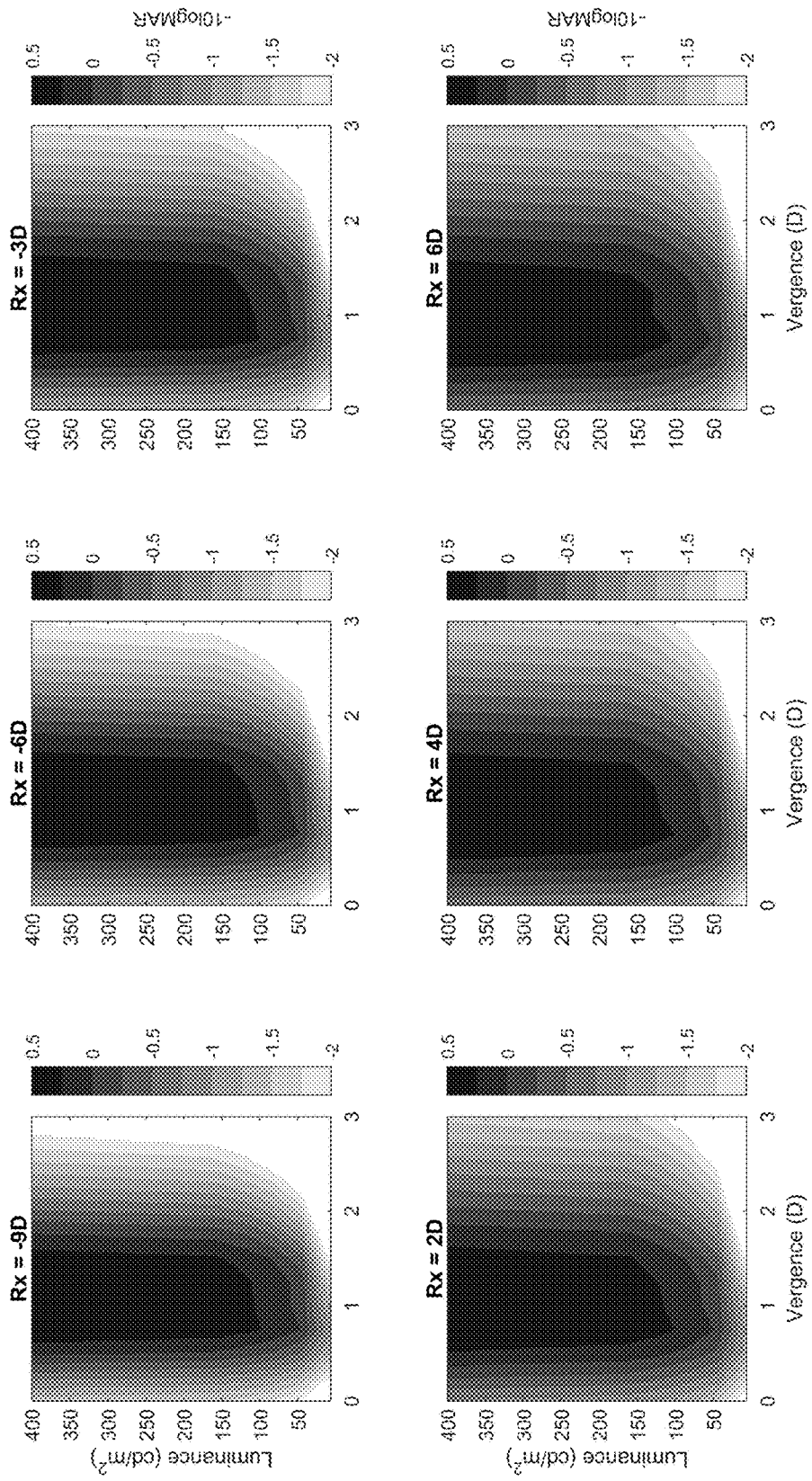
FIG. 9 shows example graphs of visual performance of a comparative lens system for various prescriptions (Rx) and an Add of 2.50 D.
Figure 10:
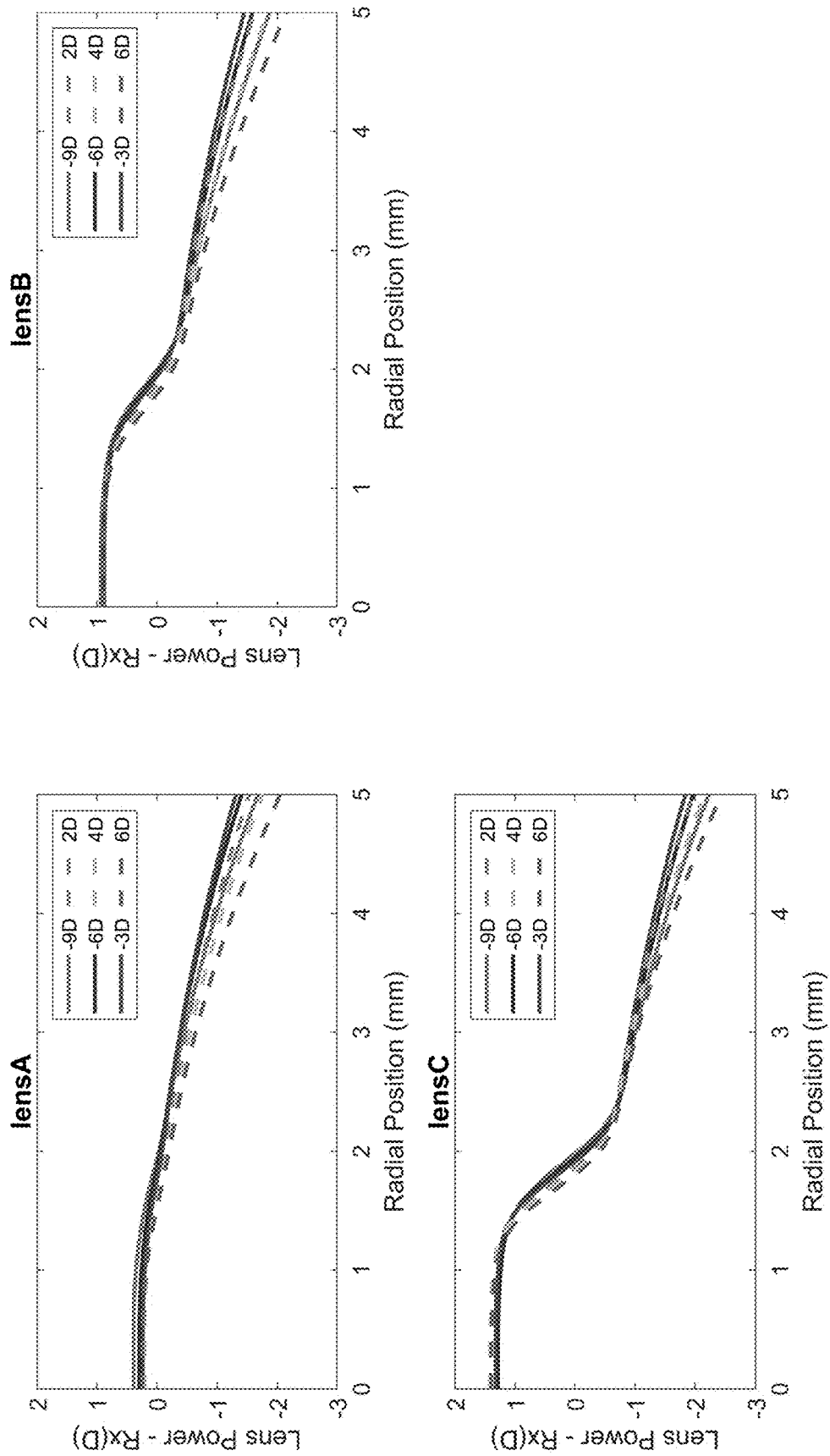
FIG. 10 shows example power profiles and fit guides for a lens system in accordance with the present disclosure.
Figure 33:
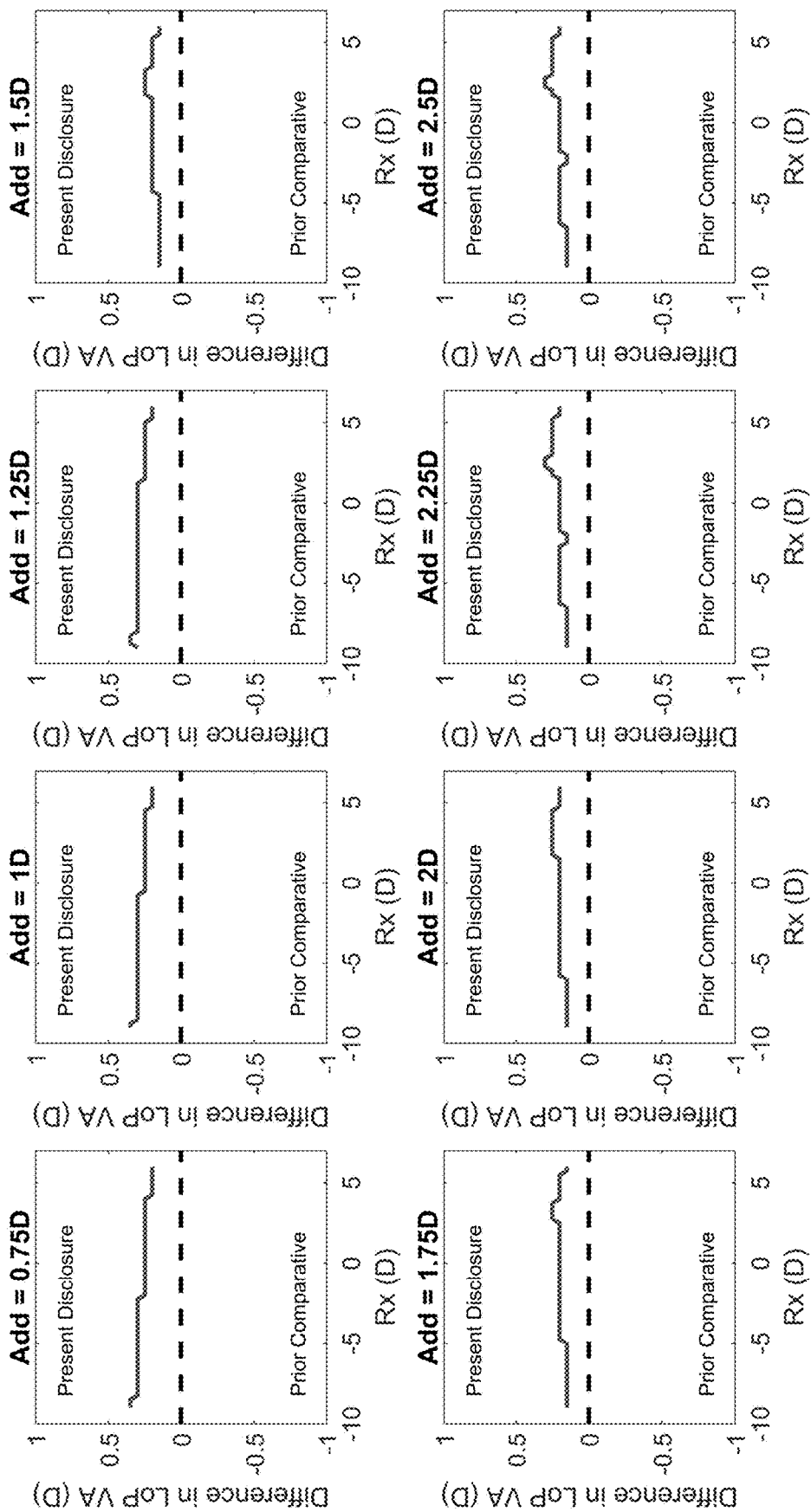

FIG. 33 illustrates comparative plots of a difference in location of peak visual acuity between the comparative lens system of FIG. 1 and the lens system in accordance with the present disclosure, an example of which is shown in FIG. 10, for a non-dominant eye in mid luminance (luminance=20 cd/m$^2$) across various Add powers. The dashed line is a reference representing zero difference, below the line indicates a greater effective add for prior art lenses such as shown in FIG. 1 and above the line indicates a greater effective add for lenses in accordance to the present disclosure such as shown in FIG. 10.

Figure 34:
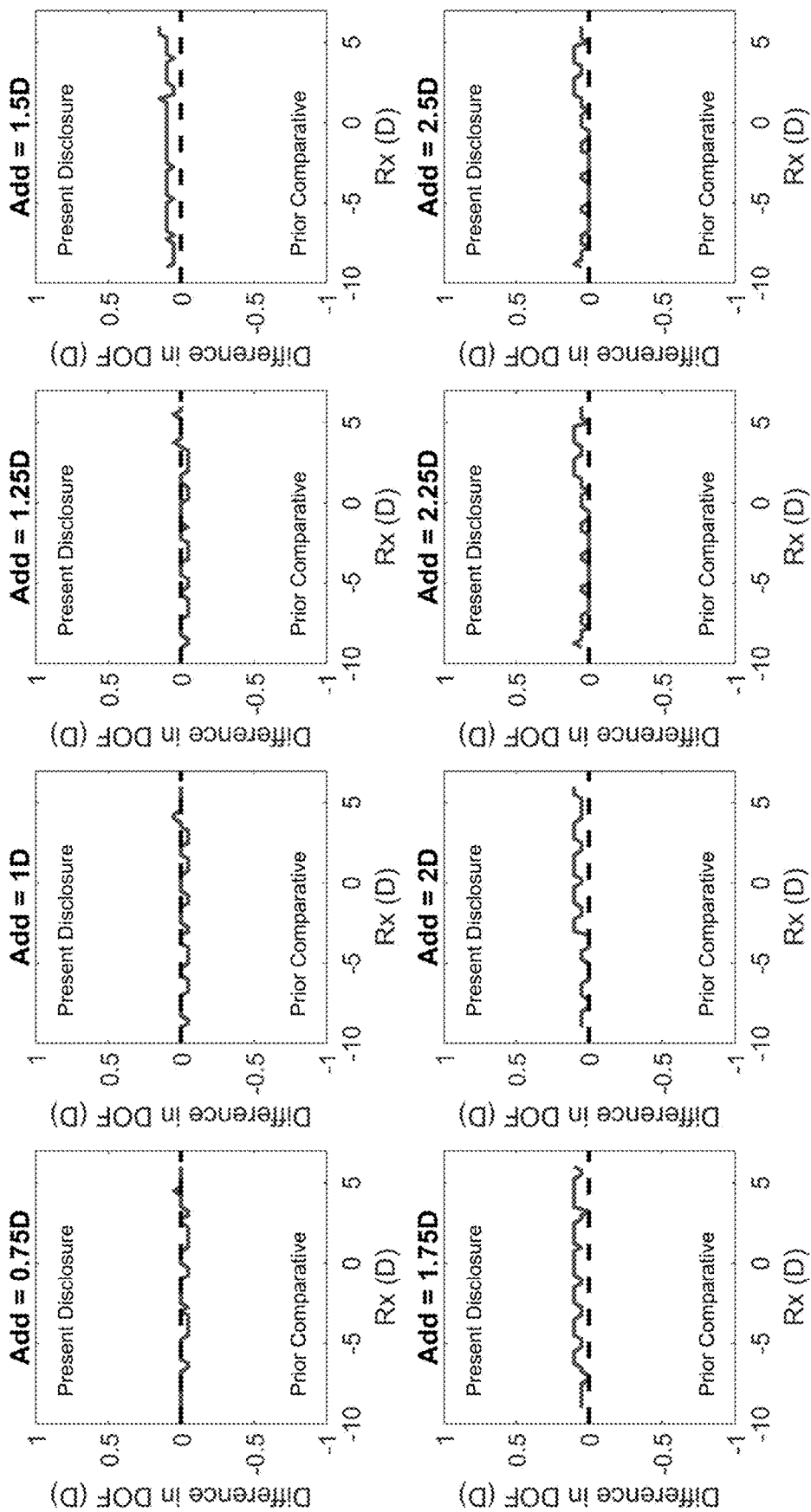

FIG. 34 illustrates comparative plots of a difference in depth of focus between the comparative lens system of FIG. 1 and the lens system in accordance with the present disclosure, an example of which is shown in FIG. 10, for a dominant eye in mid luminance (luminance=20 cd/m$^2$) across various Add powers. The dashed line is a reference representing zero difference, below the line indicates a greater DOF prior art lenses such as shown in FIG. 1 and above the line indicates a greater effective add for lenses in accordance to the present disclosure such as shown in FIG. 10.

Figure 35:
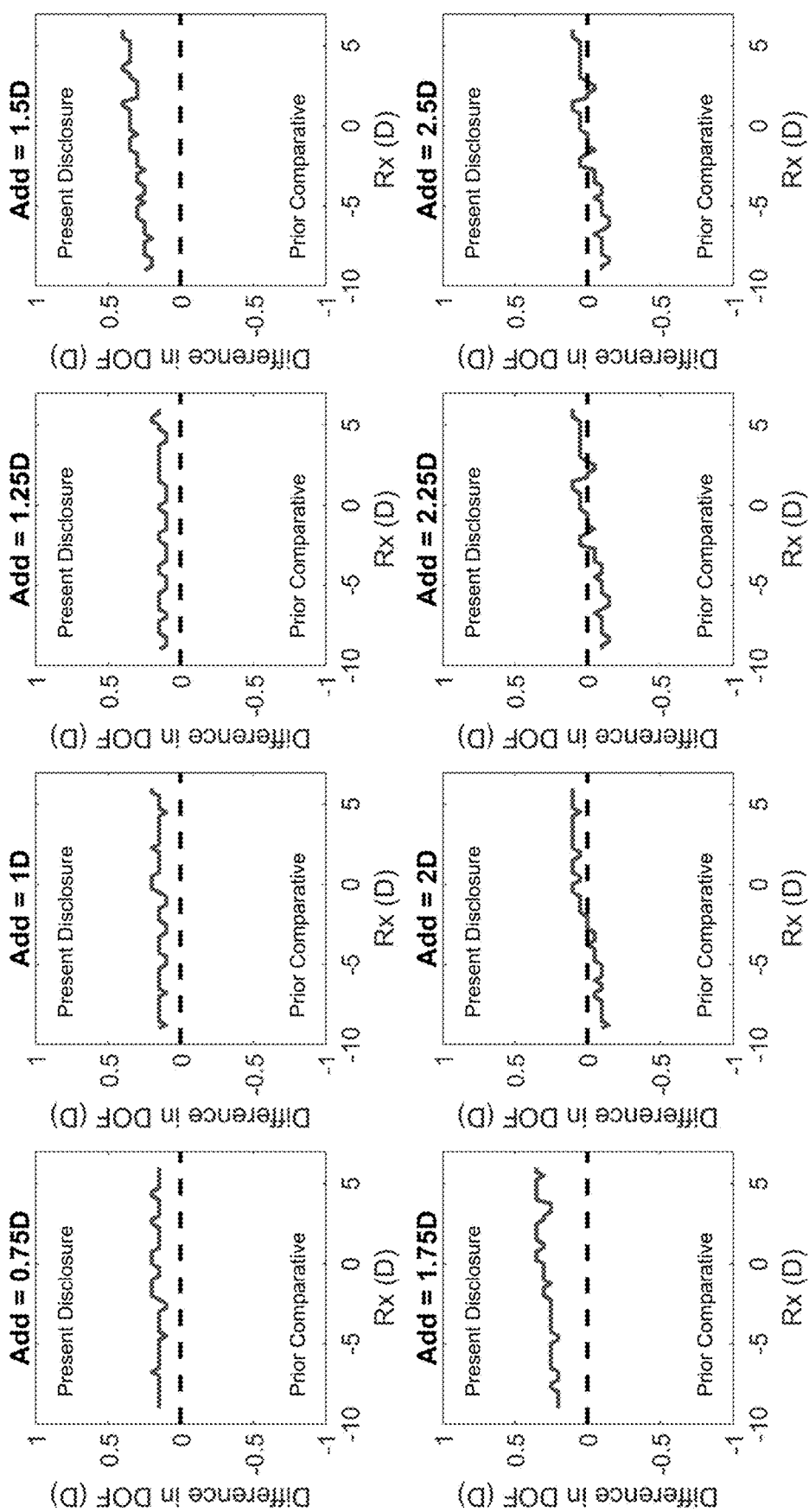

FIG. 35 illustrates comparative plots of a difference in depth of focus between the comparative lens system of FIG. 1 and the lens system in accordance with the present disclosure, an example of which is shown in FIG. 10, for a non-dominant eye in mid luminance (luminance=20 cd/m$^2$) across various Add powers. The dashed line is a reference representing zero difference, below the line indicates a greater DOF for prior art lenses such as shown in FIG. 1 and above the line indicates a greater effective add for lenses in accordance to the present disclosure such as shown in FIG. 10.

Figure 36:
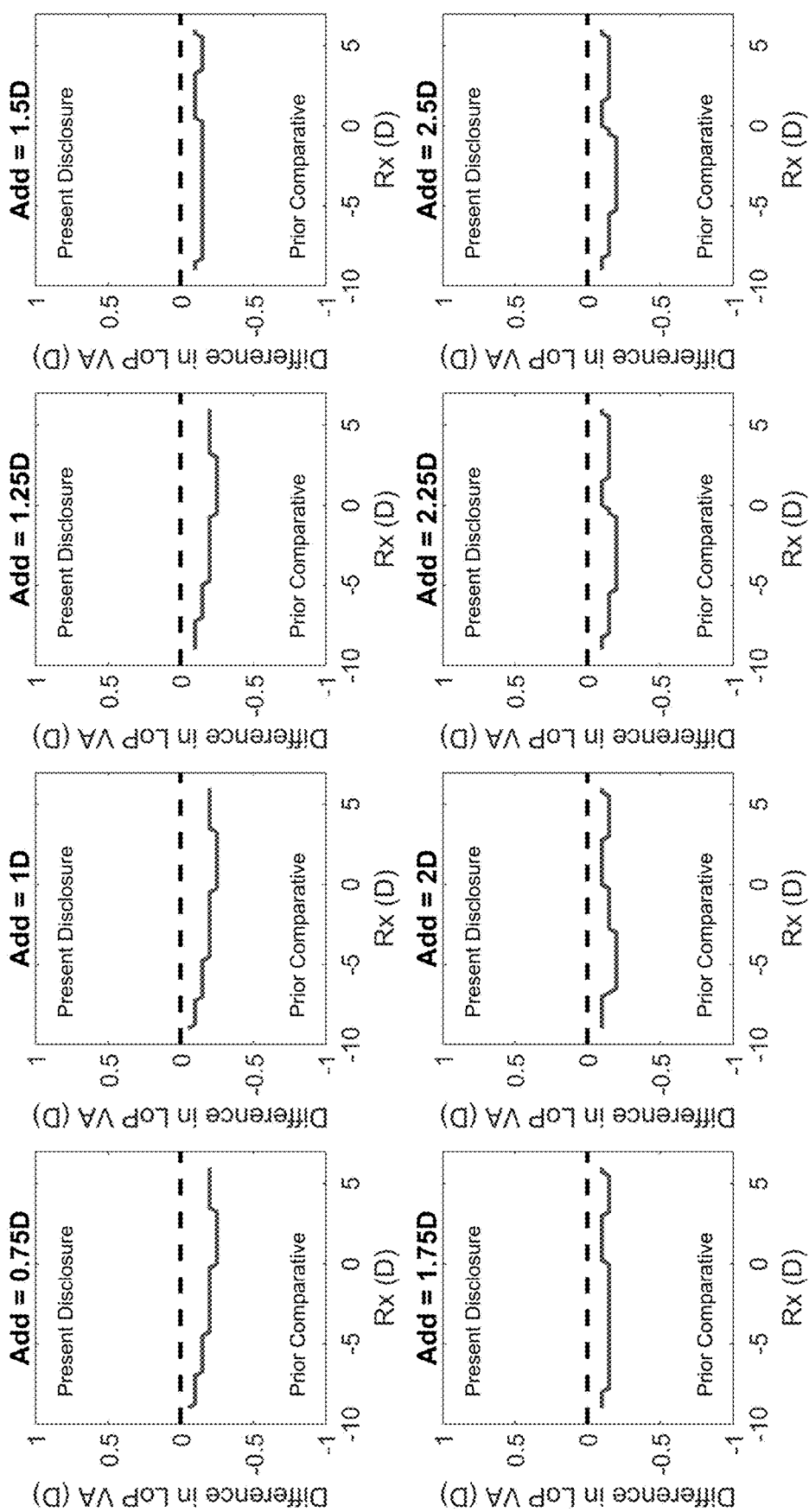

FIG. 36 illustrates comparative plots of a difference in location of peak visual acuity between the comparative lens system of FIG. 1 and the lens system in accordance with the present disclosure, an example of which is shown in FIG. 10, for a dominant eye in higher luminance (luminance=400 cd/m$^2$) across various Add powers. The dashed line is a reference representing zero difference, below the line indicates a greater effective add for prior art lenses such as shown in FIG. 1 and above the line indicates a greater effective add for lenses in accordance to the present disclosure such as shown in FIG. 10.

Figure 37:
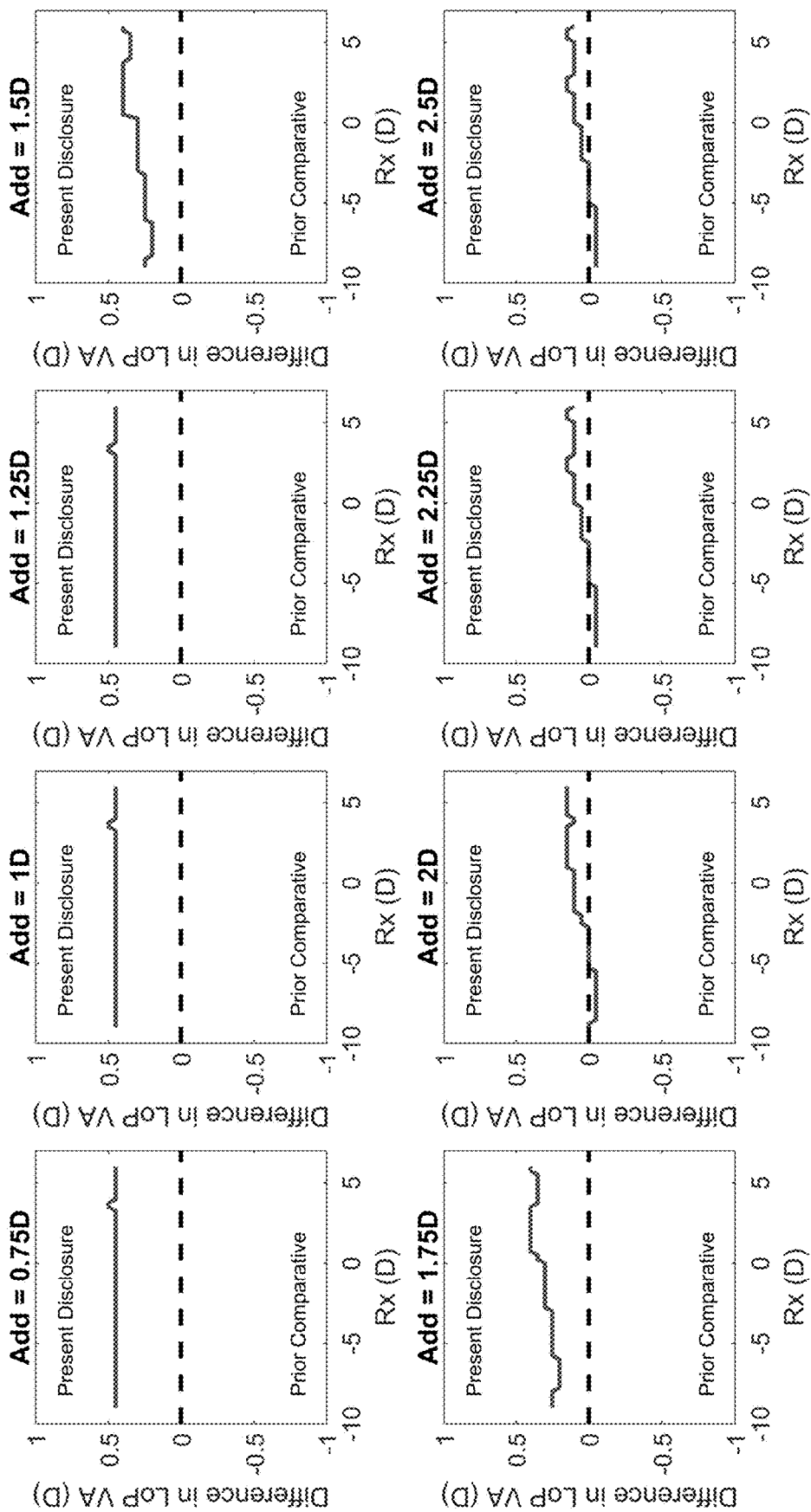

FIG. 37 illustrates comparative plots of a difference in location of peak visual acuity between the comparative lens system of FIG. 1 and the lens system in accordance with the present disclosure, an example of which is shown in FIG. 10, for a non-dominant eye in higher luminance (luminance=400 cd/m$^2$) across various Add powers. The dashed line is a reference representing zero difference, below the line indicates a greater effective add for prior art lenses such as shown in FIG. 1 and above the line indicates a greater effective add for lenses in accordance to the present disclosure such as shown in FIG. 10.

Figure 38:
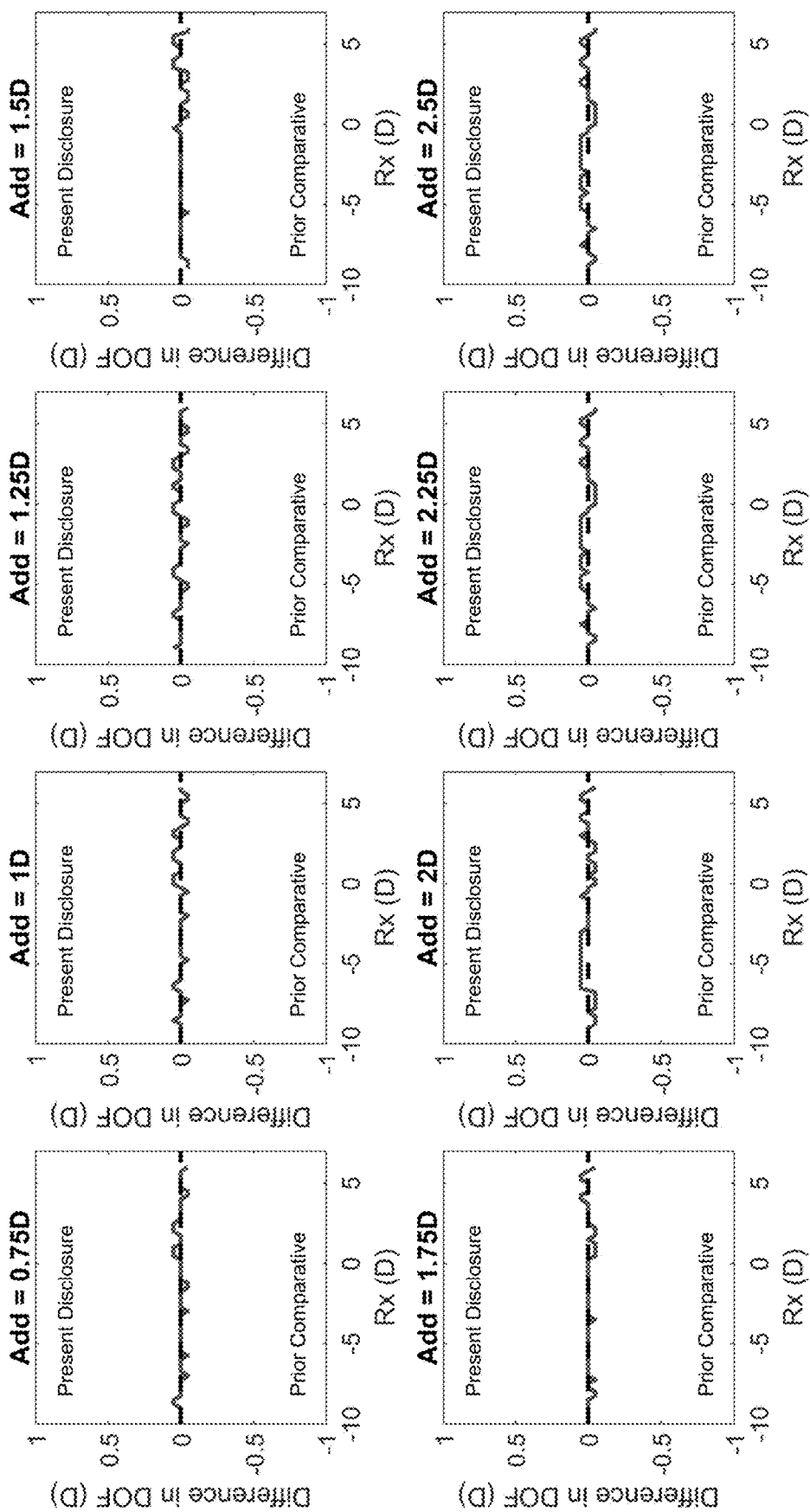

FIG. 38 illustrates comparative plots of a difference in depth of focus between the comparative lens system of FIG. 1 and the lens system in accordance with the present disclosure, an example of which is shown in FIG. 10, for a dominant eye in higher luminance (luminance=400 cd/m$^2$) across various Add powers. The dashed line is a reference representing zero difference, below the line indicates a greater DOF for prior art lenses such as shown in FIG. 1 and above the line indicates a greater effective add for lenses in accordance to the present disclosure such as shown in FIG. 10.

Figure 39:
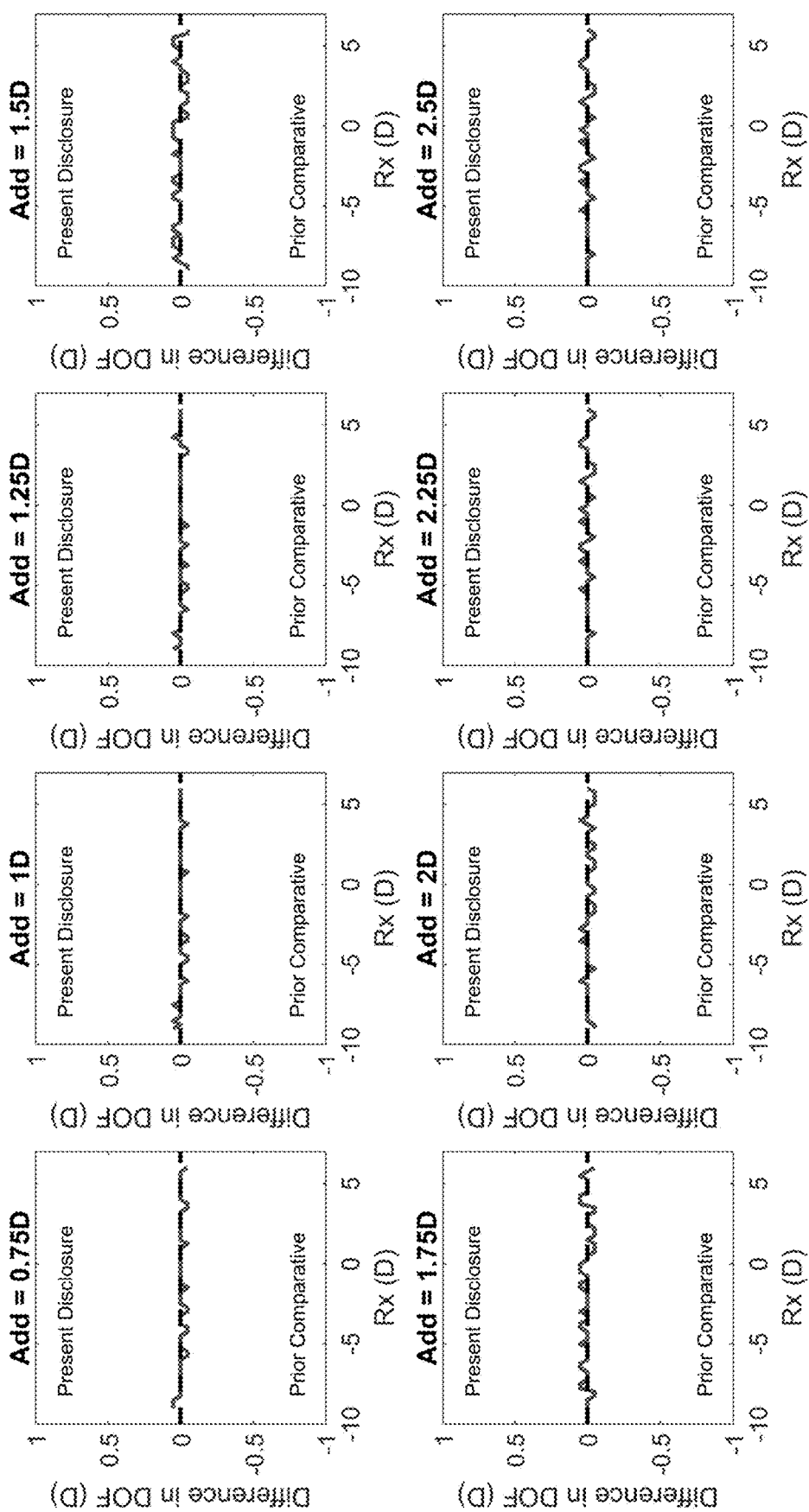

FIG. 39 illustrates comparative plots of a difference in depth of focus between the comparative lens system of FIG. 1 and the lens system in accordance with the present disclosure, an example of which is shown in FIG. 10, for a non-dominant eye in higher luminance (luminance=400 cd/m$^2$) across various Add powers. The dashed line is a reference representing zero difference, below the line indicates a greater DOF for prior art lenses such as shown in FIG. 1 and above the line indicates a greater effective add for lenses in accordance to the present disclosure such as shown in FIG. 10.

DETAILED DESCRIPTION

Described herein are systems and/or methods for customizing a system of contact lenses with interocular disparity for presbyopes. An example method may comprise a step of determining a fit associated with at least one user exhibiting presbyopia. Determining a fit may comprise optimizing a treatment plan for the particular user. Optimizing may comprise using one or more visual performance manifolds, as shown and described herein.

Described herein are systems and/or methods for designing and implementing a system of contact lenses with interocular disparity for presbyopes. An example system may comprise a plurality of lens types for treating presbyopes. The lens system may comprise at least three lens types (lens A, a lens B, and a lens C designation). The lens types may vary by one or more of effective add or DOF. Each of the plurality of lenses may be configured for an optical correction and may have a power profile associated therewith. The plurality of lenses may be grouped based on the optical correction. Each of the lenses of a particular type may have a different power profile. The optical correction normalized power profile across a range of optical corrections for each of the lens designations may be varied to improve performance considering [1] prescription (Rx), age and accommodation dependence of ocular spherical aberration, [2] Rx, age and luminance dependence of entrance pupil diameter.

The example method may comprise selecting a fit associated with at least one user exhibiting presbyopia. The method may comprise simulating, based on the fit profile, one or more visual performance manifolds, wherein each of the visual performance manifolds is generated based on lens designs, an eye model, and environmental conditions. The method may comprise selecting, based on the selected one or more visual performance manifolds, a plurality of lenses for inclusion in a system of contact lenses for treating presbyopia, or for alterations in lens fit given the visual performance achieved, wherein each of the plurality of lenses is configured for an optical correction and has a power profile associated therewith, wherein the plurality of lenses are grouped based on the optical correction and wherein each of the lenses in a particular group has a different power profile. The method may comprise creating, based at least on the plurality of lenses and an add need, a fit guide indicating which of the plurality of lenses to be worn on a dominant eye and a non-dominant eye, wherein the fit guide provides an interocular disparity of effective add.

An example method may comprise a step of determining a plurality of lens types for inclusion in a system of contact lenses for treating presbyopes. The lens system may comprise at least three lens types (lens A, a lens B, and a lens C designation). Although other groupings and numbers of lens types may be used. Each of the plurality of lenses may be configured for an optical correction and may have a power profile associated therewith. The plurality of lenses may be grouped based on the optical correction. Each lens group may comprise at least three center-near continuous multi-focal lenses. Each group of lenses may comprise three lenses. Each group of lenses may comprise four lenses. Each group of lenses may comprise five lenses. The power profile may be between −20 D and +20 D. Determining a plurality of lens groups may comprise determining a visual performance manifold for one or more of the lenses in the plurality of lens groups.

Each of the lenses of a particular type may have a different power profile. However, the optical correction normalized power profile across a range of optical corrections for each of the lens designations may be varied to improve performance considering prescription (Rx) and accommodation dependence of ocular spherical aberration and Rx, age and luminance dependence of entrance pupil diameter. In other words, a variation of the normalized power profile across SKU (e.g., optical correction levels) may be increased compared to variation in conventional lenses or lens systems. The disclosed lens systems and methods permit a superior trade-off regarding overall through focus visual performance over conventional lenses and lens systems. As an illustrative example, such performance improvement may be achieved by leveraging the capacity of the visual system to tolerate interocular refractive disparity to further increase the cyclopean depth of focus (DOF). Additionally or alternatively, the disclosed lens designs employ more add power, more variation in design across SKU, and a visual performance manifold optimized fit/refit prescription, as compared to conventional lenses or lens systems.

A fit guide may be created and/or used. The fit guide may be created based at least on the plurality of lenses and an add need. The fit guide may be customized for a user or users. Various fit guides may be created and compared for optimal performance for a user or users. A fit guide may indicate which of the plurality of lenses to be worn on a dominant eye and a non-dominant eye. An example fit guide may comprise one or more of the following example fit guides. Although designations for a particular fit guide application is shown, this is for illustration and should not necessarily be limited, as such.

Initial Lens Selection:

| | Add Need (D) | | | | | | | |
|---|---|---|---|---|---|---|---|---|
| | 0.75 | 1 | 1.25 | 1.5 | 1.75 | 2 | 2.25 | 2.5 |
| Dominant | lensA | lensA | lensA | lensB | lensB | lensB | lensB | lensB |
| Non-Dominant | lensB | lensB | lensB | lensC | lensC | lensC +0.25D | lensC +0.25D | lensC +0.25D |

Lens change if required for distance complaint:

| | Add Need (D) | | | | | | | |
|---|---|---|---|---|---|---|---|---|
| | 0.75 | 1 | 1.25 | 1.5 | 1.75 | 2 | 2.25 | 2.5 |
| Dominant | lensA | lensA | lensA | lensB | lensB | lensB | lensB | lensB |
| Non-Dominant | lensB −0.25D | lensB −0.25D | lensB −0.25D | lensB +0.25D | lensB +0.25D | lensB +0.50D | lensB +0.50D | lensB +0.50D |

Lens change if required for near complaint:

| | Add Need (D) | | | | | | | |
|---|---|---|---|---|---|---|---|---|
| | 0.75 | 1 | 1.25 | 1.5 | 1.75 | 2 | 2.25 | 2.5 |
| Dominant | lensA | lensA | lensA | lensB | lensB | lensB | lensB | lensB |
| Non-Dominant | lensB +0.25D | lensB +0.25D | lensB +0.25D | lensC +0.25D | lensC +0.25D | lensC +0.50D | lensC +0.50D | lensC +0.50D |

Lens change if required for second distance complaint:

| | Add Need (D) | | | | | | | |
|---|---|---|---|---|---|---|---|---|
| | 0.75 | 1 | 1.25 | 1.5 | 1.75 | 2 | 2.25 | 2.5 |
| Dominant | lensA | lensA | lensA | lensB | lensB | lensB | lensB | lensB |
| Non-Dominant | lensA +0.25D | lensA +0.25D | lensA +0.25D | lensC −0.25D | lensC −0.25D | lensC | lensC | lensC |

Lens change if required for second near complaint:

| | Add Need (D) | | | | | | | |
|---|---|---|---|---|---|---|---|---|
| | 0.75 | 1 | 1.25 | 1.5 | 1.75 | 2 | 2.25 | 2.5 |
| Dominant | lensB −0.25D | lensB −0.25D | lensB −0.25D | lensC −0.25D | lensC −0.25D | lensC −0.25D | lensC −0.25D | lensC −0.25D |
| Non-Dominant | lensB | lensB | lensB | lensC | lensC | lensC +0.25D | lensC +0.25D | lensC +0.25D |

Figure 19:
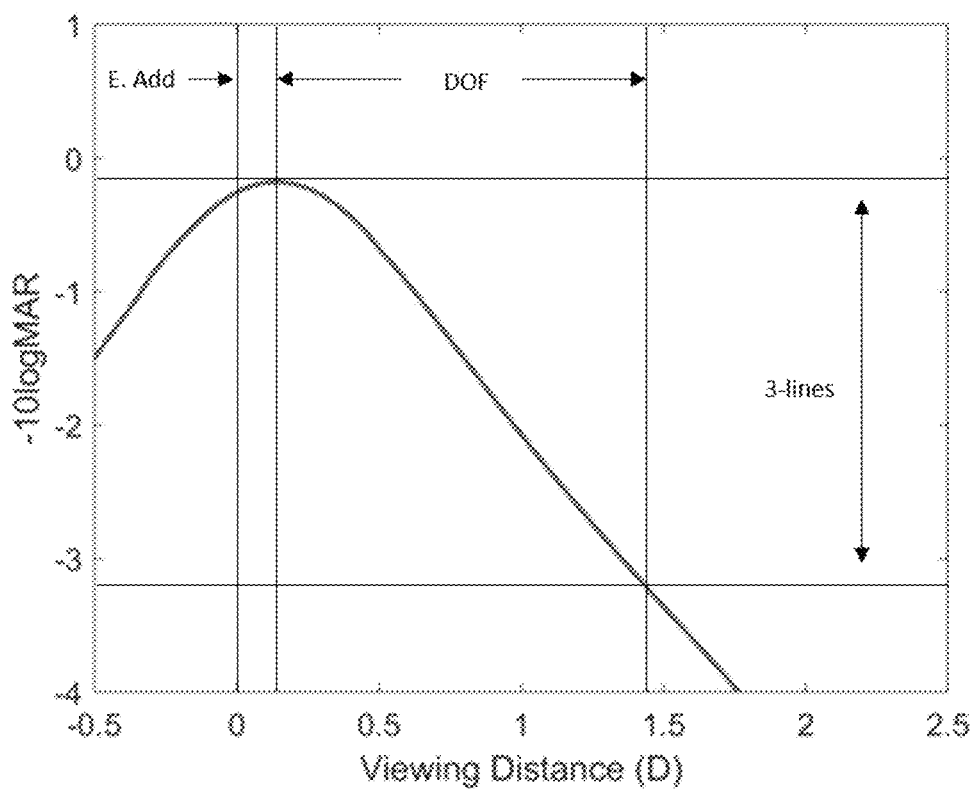
FIG. 19 shows a plot of visual performance as a function of vergence (viewing distance) to illustrate depth of focus (DOF) and effective add (E. Add).

The fit guide or guides may provide an interocular disparity of effective add. FIG. 19 shows a plot of visual performance as a function of vergence (viewing distance). The effective add may be defined as the shift between 0 vergence (distance vision) and the vergence of peak performance. The interocular disparity of effective add is the difference in effective add between the dominant and non-dominant eyes.

DOF is a 3-line drop from peak performance. The plot in FIG. 19 may be illustrative in describing each lens and the resulting disparity. Such disparity in the present disclosure may be different from 0, which is the disparity of the fit guide for the conventional lenses such as MF in low and mid add needs. Other fit guides may be used. Optimization may be based on the use of additional fit guides for distance and/or near adjustments and based on patient reported performance. Although various techniques may be used, fit optimization may be conducted by the doctor with feedback from the patient. The alternative fit guide(s) may be determined using visual performance manifolds to obtain the alternatives that provide the best visual performance in the event of certain complaints from the patient.

As a comparison, the following tables show effective add for a conventional MF lens system and a lens system in accordance with the present disclosure.

Effective Add Tables

| | MF, Rx = −3 D | | |
|---|---|---|---|
| Lens | Effective Add @ 2.5 cd/m² | Effective Add @ 120 cd/m² | Effective Add @ 400 cd/m² |
| Lens A | 0.25 D | 0.30 D | 0.30 D |
| Lens B | 0.60 D | 0.85 D | 0.90 D |
| Lens C | 0.80 D | 1.25 D | 1.40 D |

| Lens Fit (MF, Rx = −3 D) | | | | | | | | |
|---|---|---|---|---|---|---|---|---|
| | Add Need | | | | | | | |
| Eye | 0.75 D | 1.00 D | 1.25 D | 1.50 D | 1.75 D | 2.00 D | 2.25 D | 2.50 D |
| Dom | A | A | A | B | B | B | B | B |
| Non | A | A | A | B | B | C | C | C |

| Interocular Disparity of Effective Add | | | | | | | | |
|---|---|---|---|---|---|---|---|---|
| | Add Need | | | | | | | |
| Luminance | 0.75 D | 1.00 D | 1.25 D | 1.50 D | 1.75 D | 2.00 D | 2.25 D | 2.50 D |
| 2.5 cd/m² | 0.00 D | 0.00 D | 0.00 D | 0.00 D | 0.00 D | 0.20 D | 0.20 D | 0.20 D |
| 120 cd/m² | 0.00 D | 0.00 D | 0.00 D | 0.00 D | 0.00 D | 0.40 D | 0.40 D | 0.40 D |
| 400 cd/m² | 0.00 D | 0.00 D | 0.00 D | 0.00 D | 0.00 D | 0.50 D | 0.50 D | 0.50 D |

| | New Optic, Rx = −3 D | | |
|---|---|---|---|
| Lens | Effective Add @ 2.5 cd/m² | Effective Add @ 120 cd/m² | Effective Add @ 400 cd/m² |
| Lens A | 0.05 D | 0.10 D | 0.10 D |
| Lens B | 0.25 D | 0.70 D | 0.75 D |
| Lens C | 1.00 D | 1.15 D | 1.15 D |
| Lens C+ | 1.25 D | 1.40 D | 1.40 D |

| | Lens Fit (New Optic, Rx = −3 D) | | | | | | | |
|---|---|---|---|---|---|---|---|---|
| | Add Need | | | | | | | |
| Eye | 0.75 D | 1.00 D | 1.25 D | 1.50 D | 1.75 D | 2.00 D | 2.25 D | 2.50 D |
| Dom | A | A | A | B | B | B | B | B |
| Non | B | B | B | C | C | C+ | C+ | C+ |

| | Interocular Disparity of Effective Add | | | | | | | |
|---|---|---|---|---|---|---|---|---|
| | Add Need | | | | | | | |
| Luminance | 0.75 D | 1.00 D | 1.25 D | 1.50 D | 1.75 D | 2.00 D | 2.25 D | 2.50 D |
| 2.5 cd/m² | 0.20 D | 0.20 D | 0.20 D | 0.75 D | 0.75 D | 1.00 D | 1.00 D | 1.00 D |
| 120 cd/m² | 0.60 D | 0.60 D | 0.60 D | 0.45 D | 0.45 D | 0.70 D | 0.70 D | 0.70 D |
| 400 cd/m² | 0.65 D | 0.65 D | 0.65 D | 0.40 D | 0.40 D | 0.65 D | 0.65 D | 0.65 D |

FIGS. 28-39 illustrate comparison of the effective add and DOF between the conventional lenses/lens systems (MF) and a lens system in accordance with the present disclosure.

As a further example, fit guides may be based on one or more visual performance manifolds. As such, a fit guide may be customized for a user or group of users based on comparative testing or optimizing visual performance manifolds for the user or users.

As an illustrative example, lens design optimization procedure may be based on visual performance. A metric of monocular visual performance is given by:

$$\varphi_{eye} = \int MTF(v)^2 NCSF(v)^2 dv$$

where MTF is the modulation transfer function of the lens+eye combination, NCSF is the neural contrast sensitivity function for a given pupil size and luminance and $v$ is spatial frequency.

Binocular visual performance is obtained using a vectorial model:

$$\Phi_{bin} \sqrt{(\varphi_{dom}^2 + \varphi_{non}^2 - \alpha \varphi_{dom} \varphi_{non})}$$

where the subscripts dom and non refer to the dominant and nondominant eye, respectively, and $\alpha$ is a constant.

Optimization of visual performance is obtained across a range of eye models (spanning the age and add need range typical of a presbyopic population) by minimization:

$$\min \Sigma [\varphi_{ideal} - \varphi_{bin}]$$

where $\psi_{ideal}$ is obtained using diffraction limited binocular visual performance.

Figure 20:
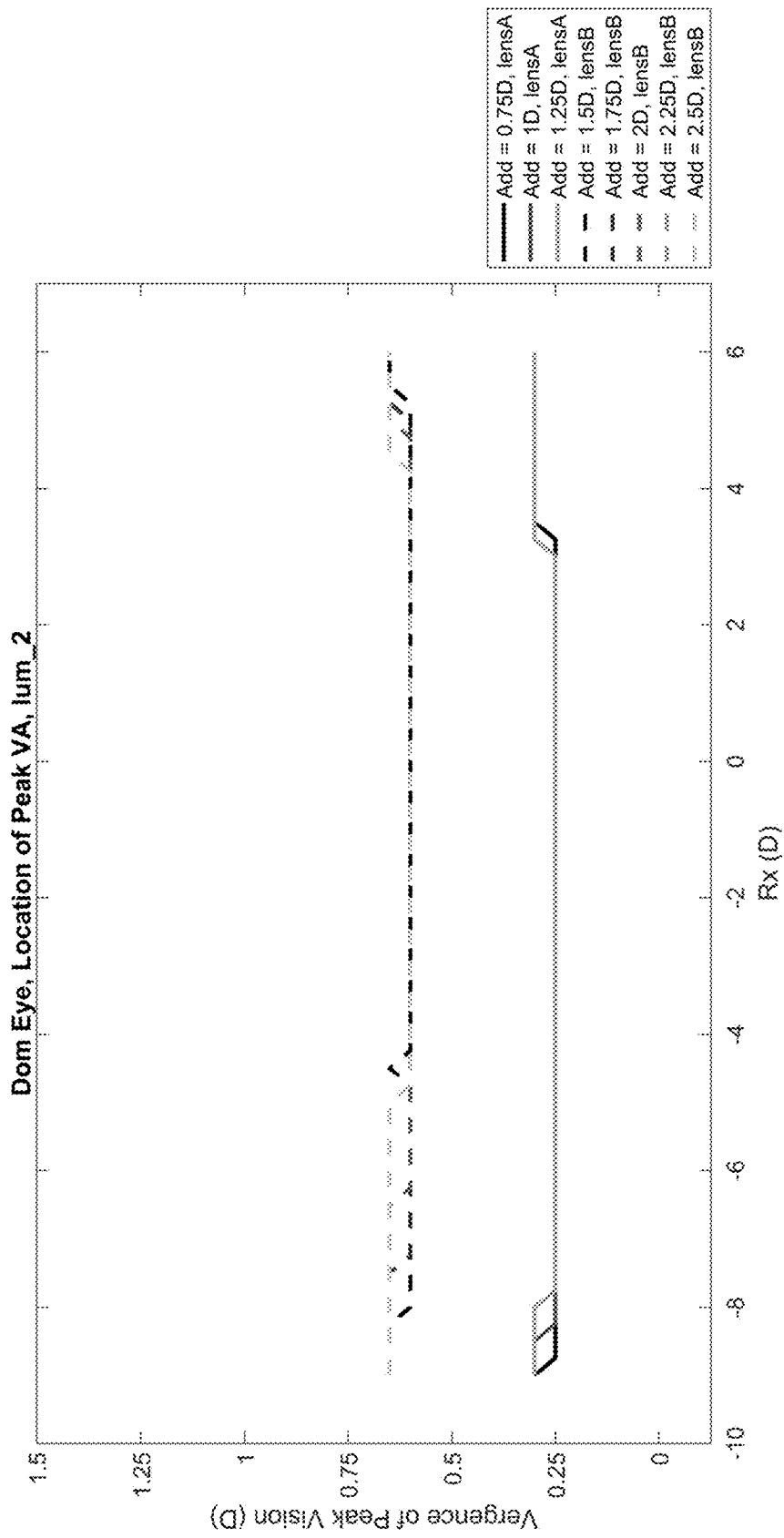
FIG. 20 illustrates plots of location of peak (LoP) visual acuity of the comparative lens system of FIG. 1 for a dominant eye in low luminance (luminance=2 cd/m$^2$) across various Add powers.
Figure 22:
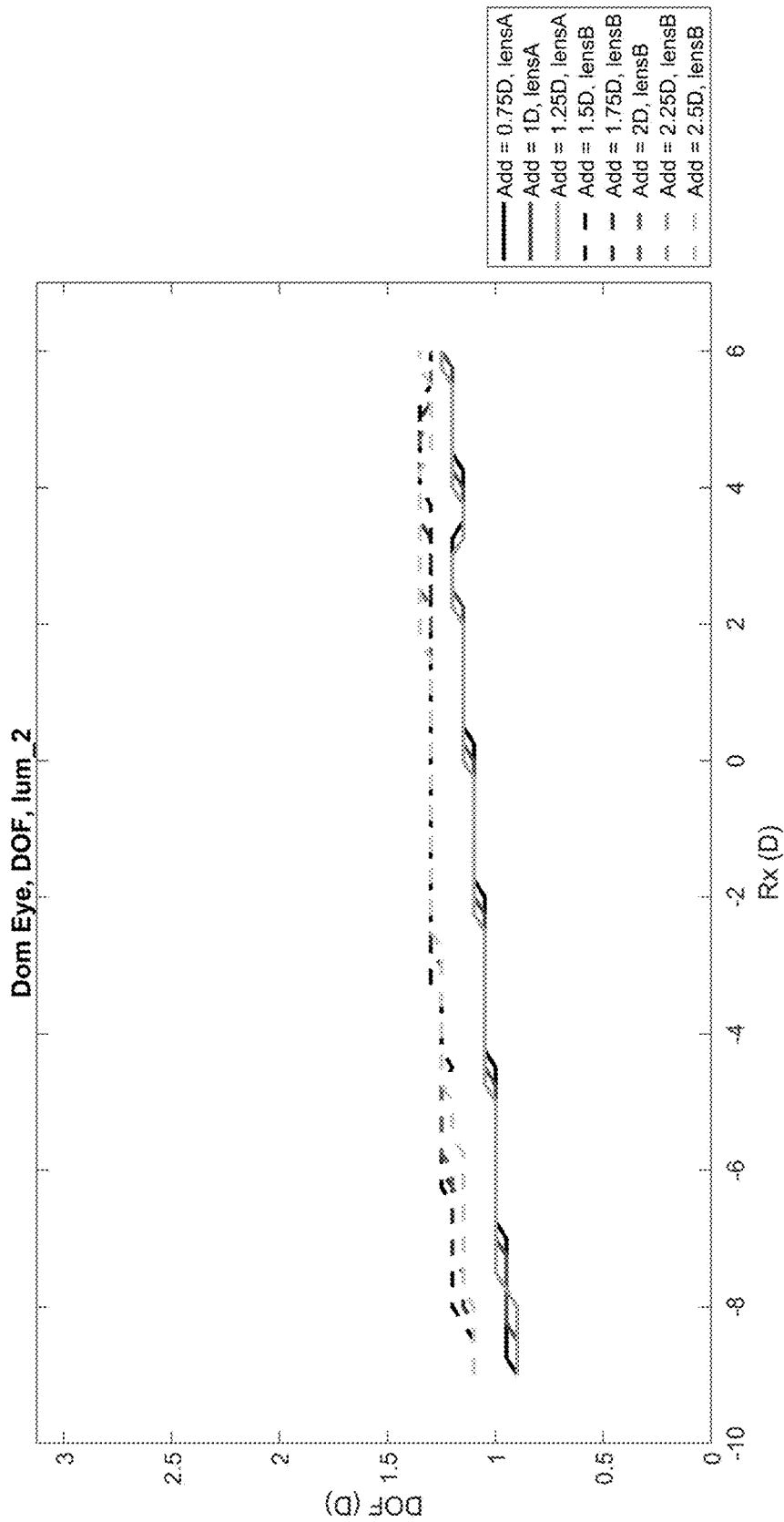
FIG. 22 illustrates plots of depth of focus of the comparative lens system of FIG. 1 for a dominant eye in low luminance (luminance=2 cd/m$^2$) across various Add powers.
Figure 24:
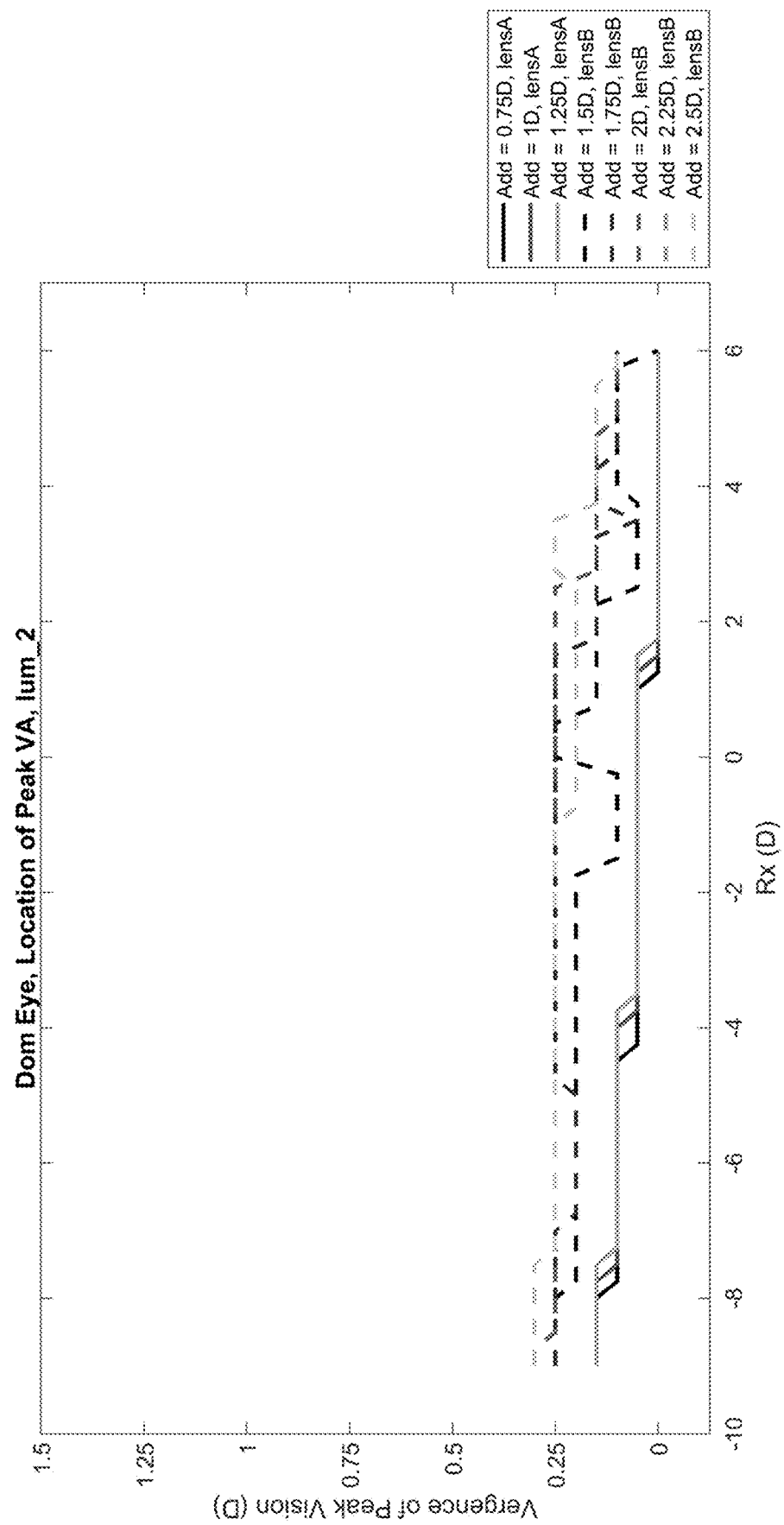
FIG. 24 illustrates plots of location of peak visual acuity of a lens system in accordance with the present disclosure and an example of which is shown in FIG. 10 for a dominant eye in low luminance (luminance=2 cd/m$^2$) across various Add powers.
Figure 26:
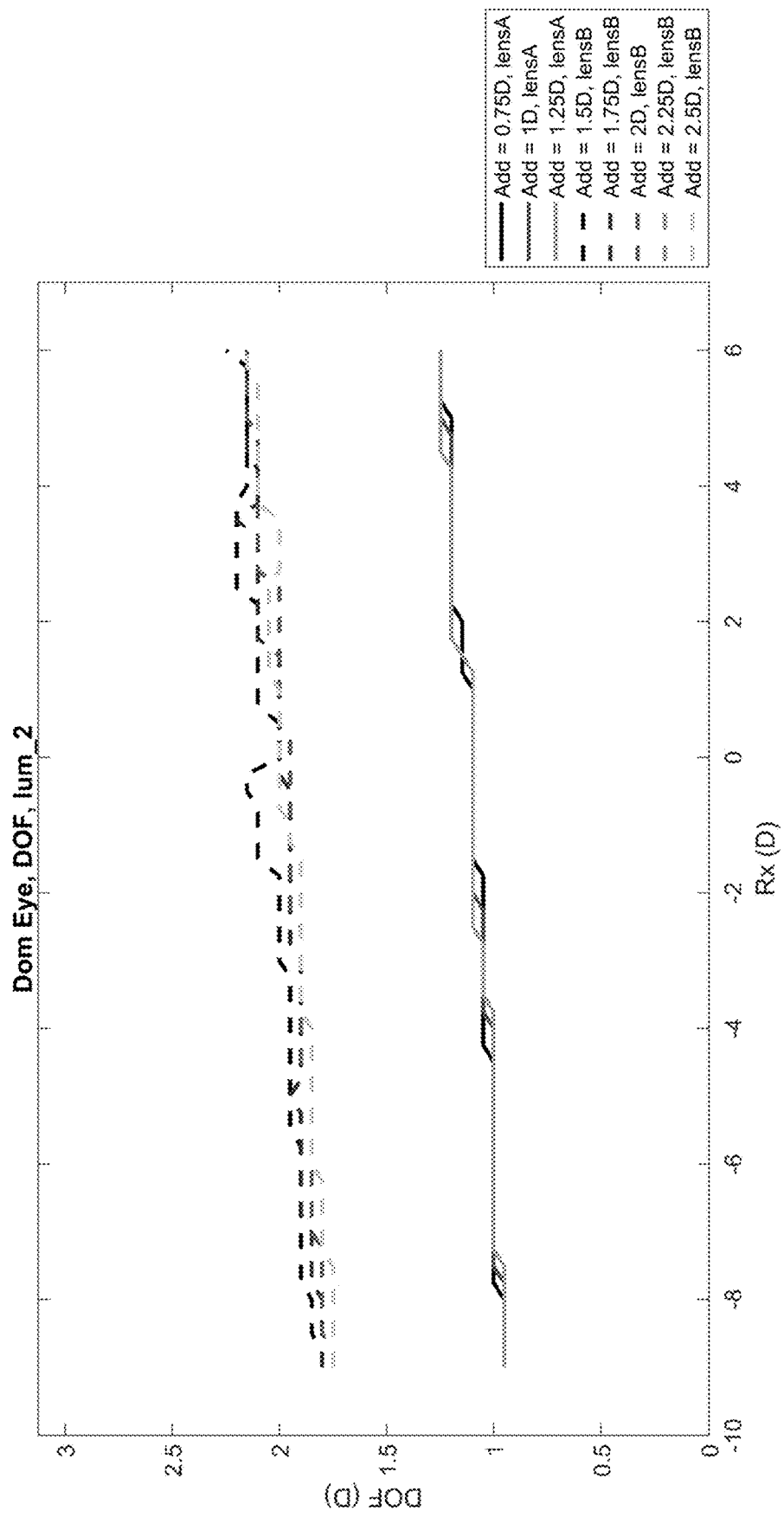
FIG. 26 illustrates plots of depth of focus of a lens system in accordance with the present disclosure and an example of which is shown in FIG. 10 for a dominant eye in low luminance (luminance=2 cd/m$^2$) across various Add powers.

FIG. 20 illustrates plots of location of peak visual acuity of the comparative lens system of FIG. 1 for a dominant eye in low luminance (luminance=2 cd/m²) across various Add powers. FIG. 22 illustrates plots of depth of focus of the comparative lens system of FIG. 1 for a dominant eye in low luminance (luminance=2 cd/m²) across various Add powers. FIG. 24 illustrates plots of location of peak visual acuity of a lens system in accordance with the present disclosure and an example of which is shown in FIG. 10 for a dominant eye in low luminance (luminance=2 cd/m²) across various Add powers. FIG. 26 illustrates plots of depth of focus of a lens system in accordance with the present disclosure and an example of which is shown in FIG. 10 for a dominant eye in low luminance (luminance=2 cd/m²) across various Add powers. In low light conditions, MF uses more effective add in the dominant eye, and the example lens system of the present disclosure uses more DOF for the mid and high adds.

Figure 21:
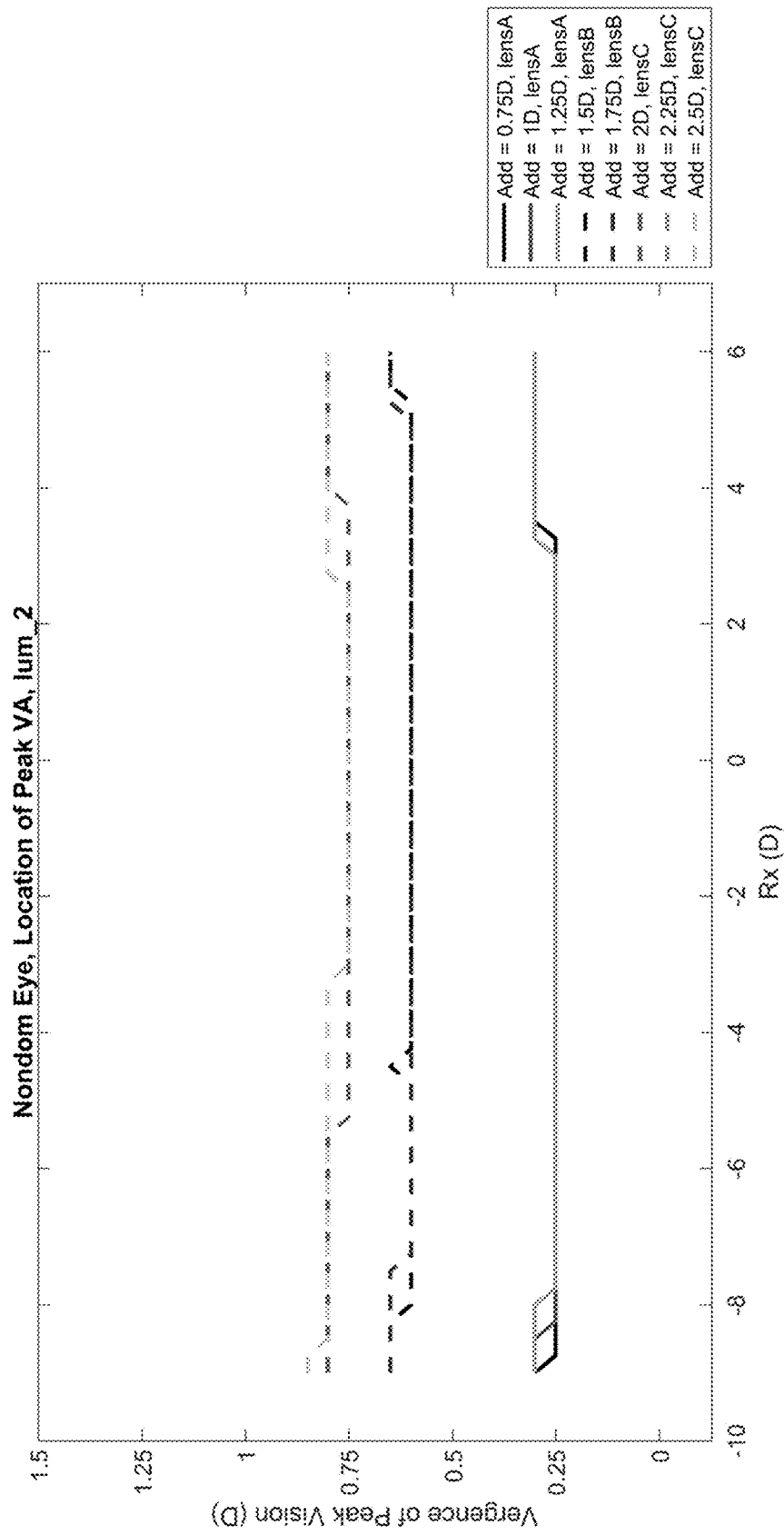
FIG. 21 illustrates plots of location of peak visual acuity of the comparative lens system of FIG. 1 for a non-dominant eye in low luminance (luminance=2 cd/m$^2$) across various Add powers.
Figure 23:
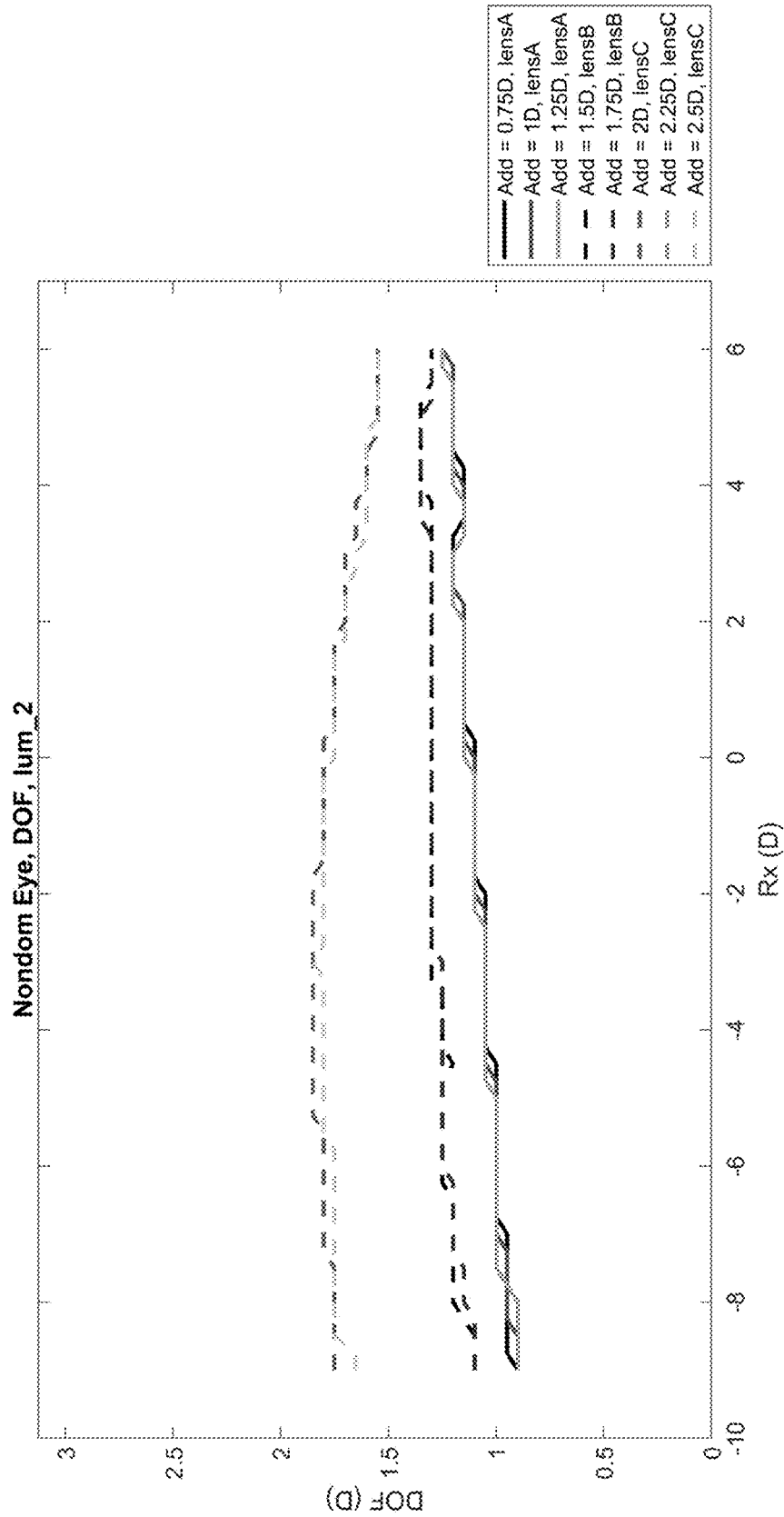
FIG. 23 illustrates plots of depth of focus of the comparative lens system of FIG. 1 for a non-dominant eye in low luminance (luminance=2 cd/m$^2$) across various Add powers.
Figure 25:
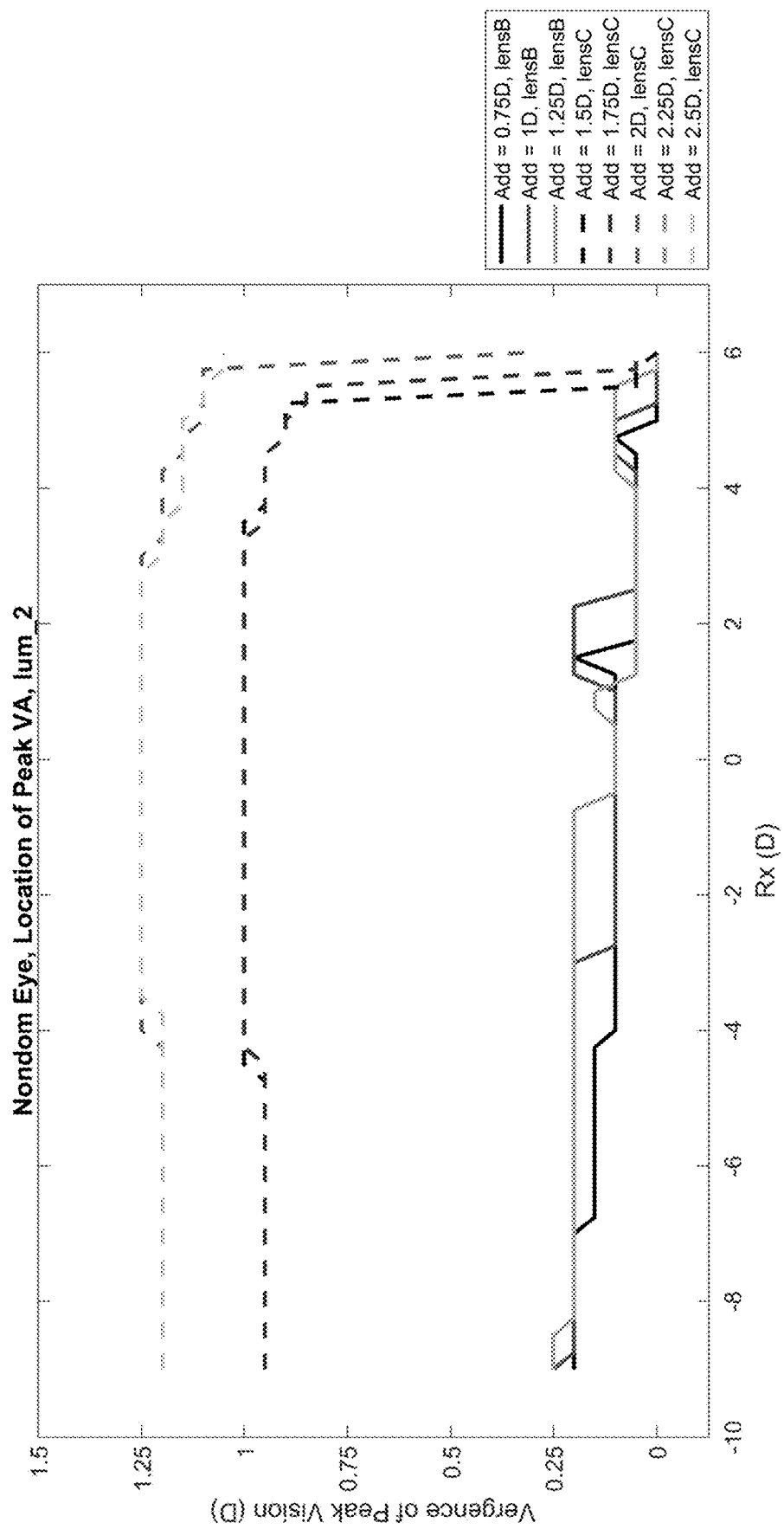
FIG. 25 illustrates plots of location of peak visual acuity of a lens system in accordance with the present disclosure and an example of which is shown in FIG. 10 for a non-dominant eye in low luminance (luminance=2 cd/m$^2$) across various Add powers.
Figure 27:
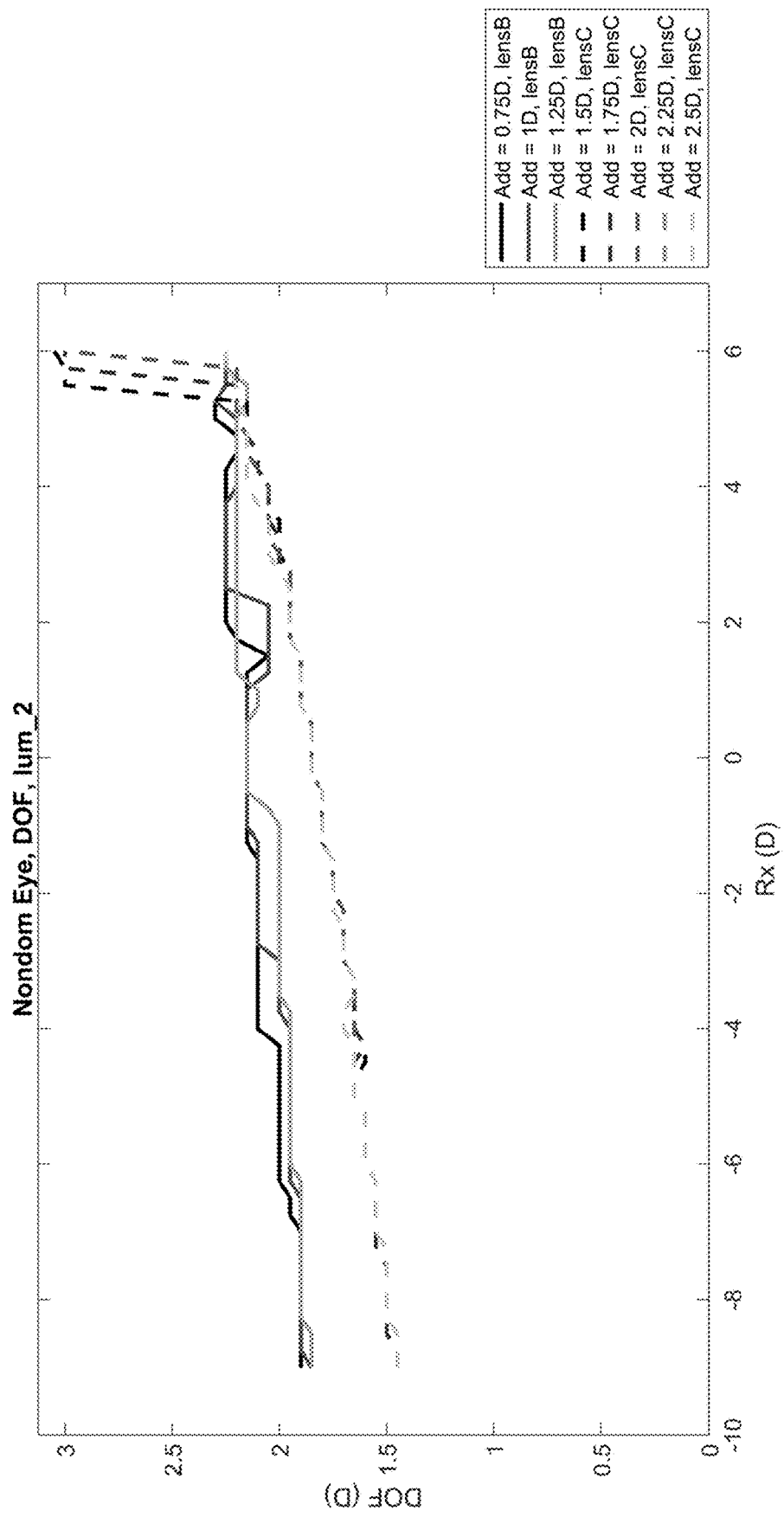
FIG. 27 illustrates plots of depth of focus of a lens system in accordance with the present disclosure and an example of which is shown in FIG. 10 for a non-dominant eye in low luminance (luminance=2 cd/m$^2$) across various Add powers.

FIG. 21 illustrates plots of location of peak visual acuity of the comparative lens system of FIG. 1 for a non-dominant eye in low luminance (luminance=2 cd/m²) across various Add powers. FIG. 23 illustrates plots of depth of focus of the comparative lens system of FIG. 1 for a non-dominant eye in low luminance (luminance=2 cd/m²) across various Add powers. FIG. 25 illustrates plots of location of peak visual acuity of a lens system in accordance with the present disclosure and an example of which is shown in FIG. 10 for a non-dominant eye in low luminance (luminance=2 cd/m²) across various Add powers. FIG. 27 illustrates plots of depth of focus of a lens system in accordance with the present disclosure and an example of which is shown in FIG. 10 for a non-dominant eye in low luminance (luminance=2 cd/m²) across various Add powers. In low light conditions, MF uses more effective add in the non-dominant eye for the low add, and the example lens system of the present disclosure uses more effective add in the mid and high add. The example lens system of the present disclosure uses more DOF in the low and mid add, and MF uses more DOF in high add myopes while the example lens system of the present disclosure uses more DOF in high add hyperopes.

Figure 28:
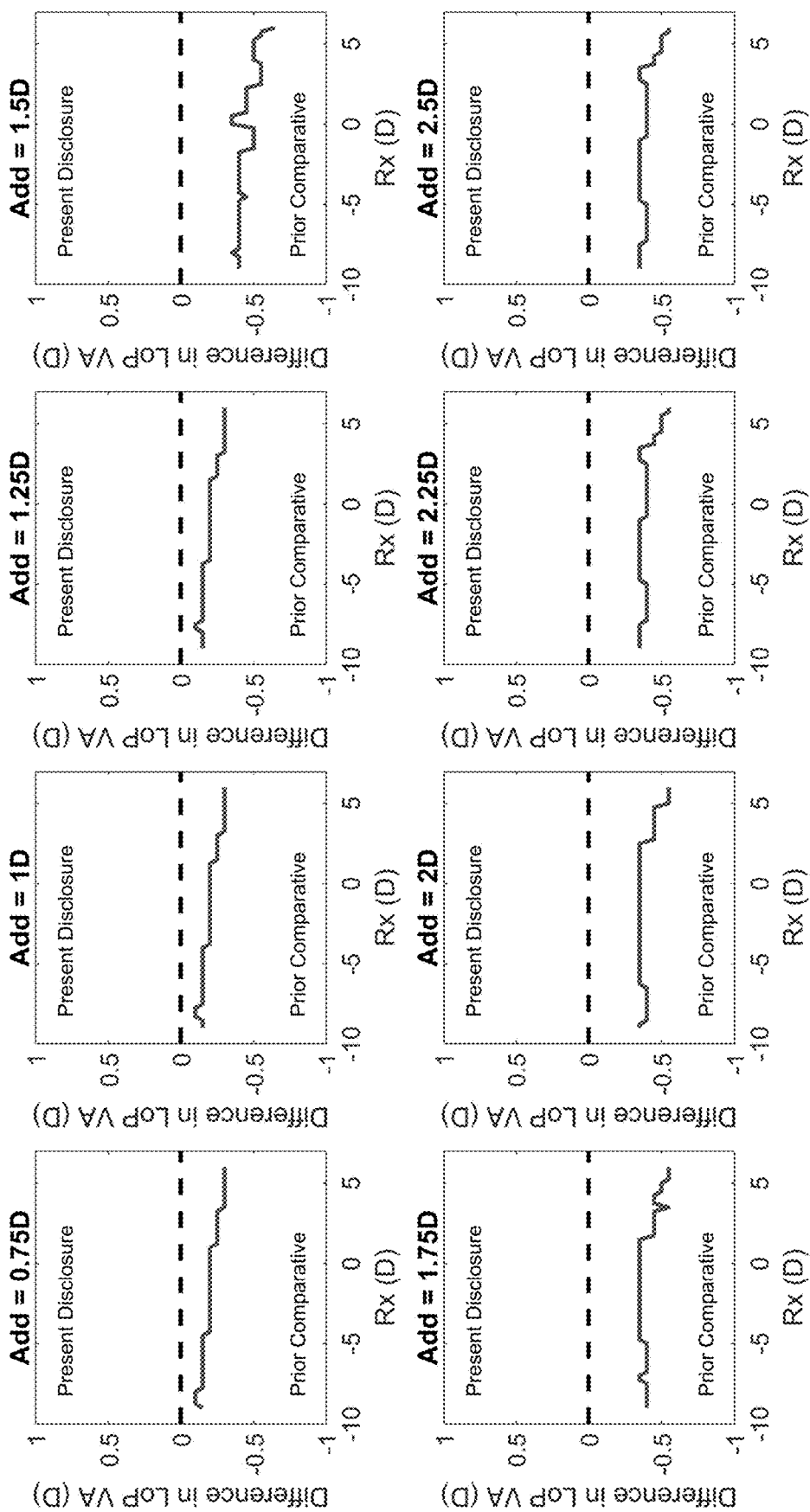
FIG. 28 illustrates comparative plots of a difference in location of peak visual acuity between the comparative lens system of FIG. 1 and the lens system in accordance with the present disclosure, an example of which is shown in FIG. 10, for a dominant eye in low luminance (luminance=2 cd/m$^2$) across various Add powers. The dashed line is a reference representing zero difference, below the line indicates a greater effective add for prior art lenses such as shown in FIG. 1 and above the line indicates a greater effective add for lenses in accordance to the present disclosure such as shown in FIG. 10.
Figure 30:
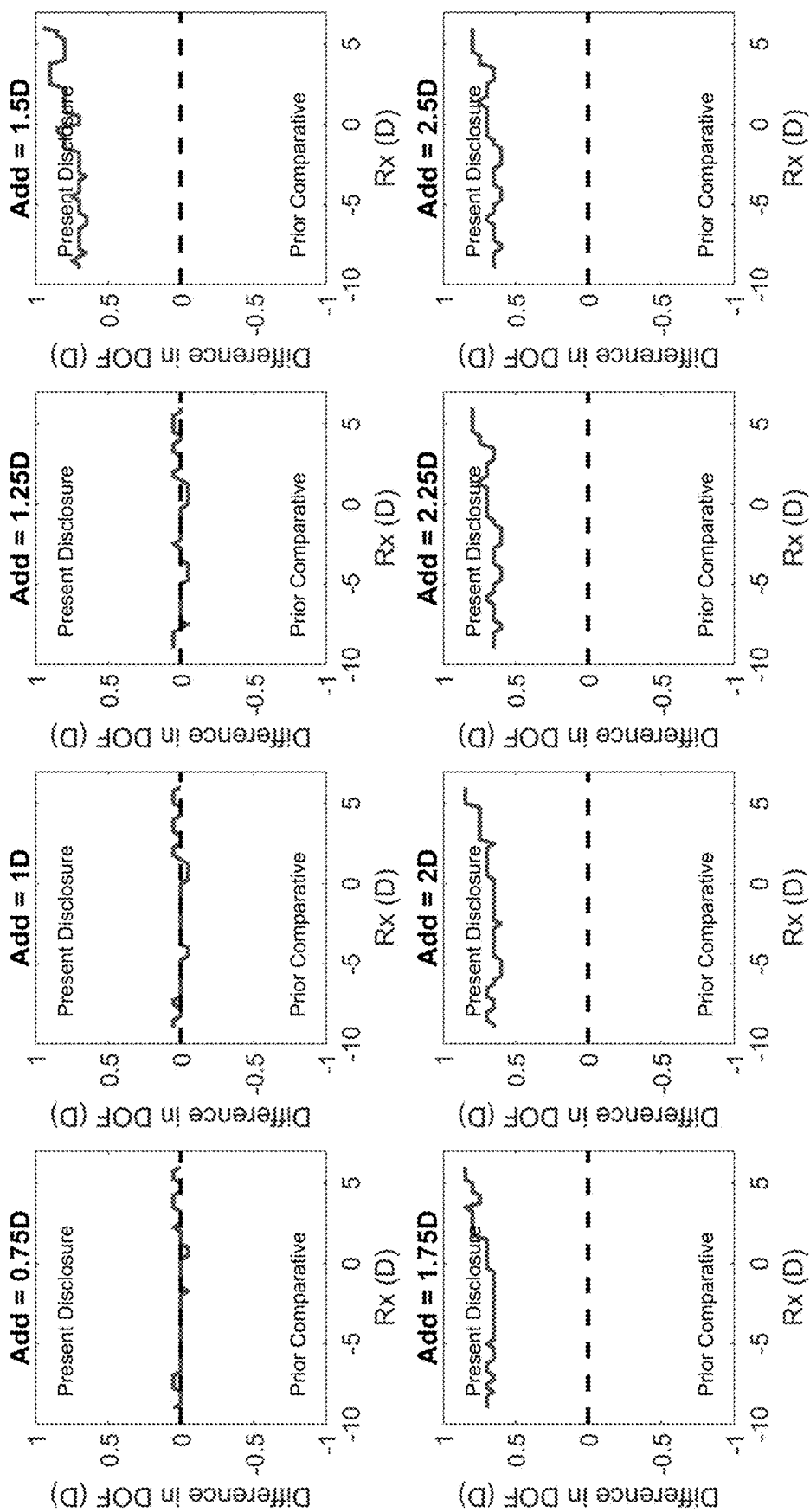
FIG. 30 illustrates comparative plots of a difference in depth of focus between the comparative lens system of FIG. 1 and the lens system in accordance with the present disclosure, an example of which is shown in FIG. 10, for a dominant eye in low luminance (luminance=2 cd/m$^2$) across various Add powers. The dashed line is a reference representing zero difference, below the line indicates a greater DOF for prior art lenses such as shown in FIG. 1 and above the line indicates a greater effective add for lenses in accordance to the present disclosure such as shown in FIG. 10.

FIG. 28 illustrates a comparison of the effective add for various Add powers for a dominant eye in dim light conditions between the conventional lenses/lens systems (MF) and a lens system in accordance with the present disclosure. FIG. 30 illustrates a comparison of the DOF for various Add powers for a dominant eye in dim light conditions between the conventional lenses/lens systems (MF) and a lens system in accordance with the present disclosure. In dim light conditions, MF uses more effective add in the dominant eye, and the example lens system of the present disclosure uses more DOF for the mid and high adds.

Figure 29:
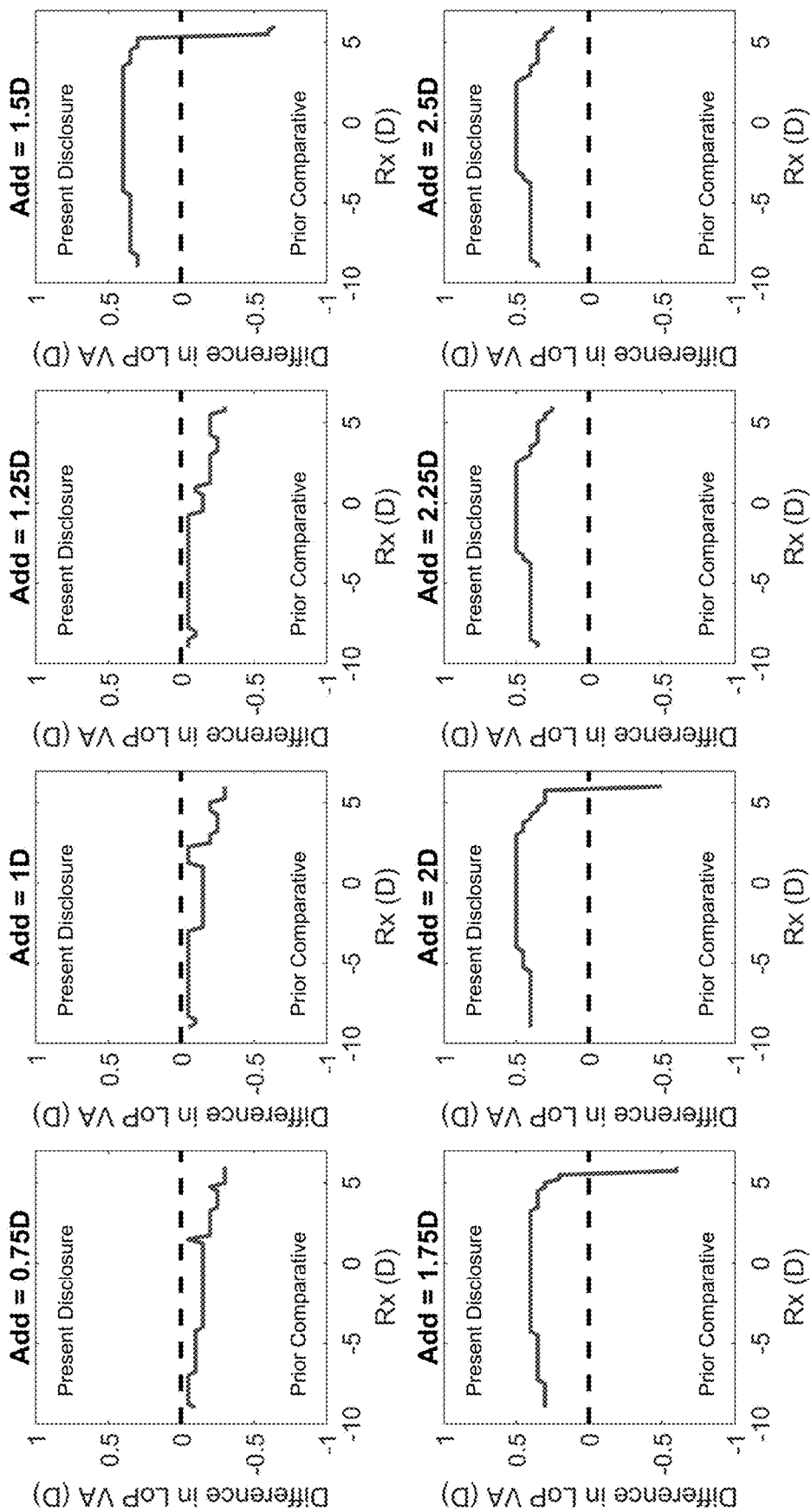
FIG. 29 illustrates comparative plots of a difference in location of peak visual acuity between the comparative lens system of FIG. 1 and the lens system in accordance with the present disclosure, an example of which is shown in FIG. 10, for a non-dominant eye in low luminance (luminance=2 cd/m$^2$) across various Add powers. The dashed line is a reference representing zero difference, below the line indicates a greater effective add for comparative lenses such as shown in FIG. 1 and above the line indicates a greater effective add for lenses in accordance to the present disclosure such as shown in FIG. 10.
Figure 31:
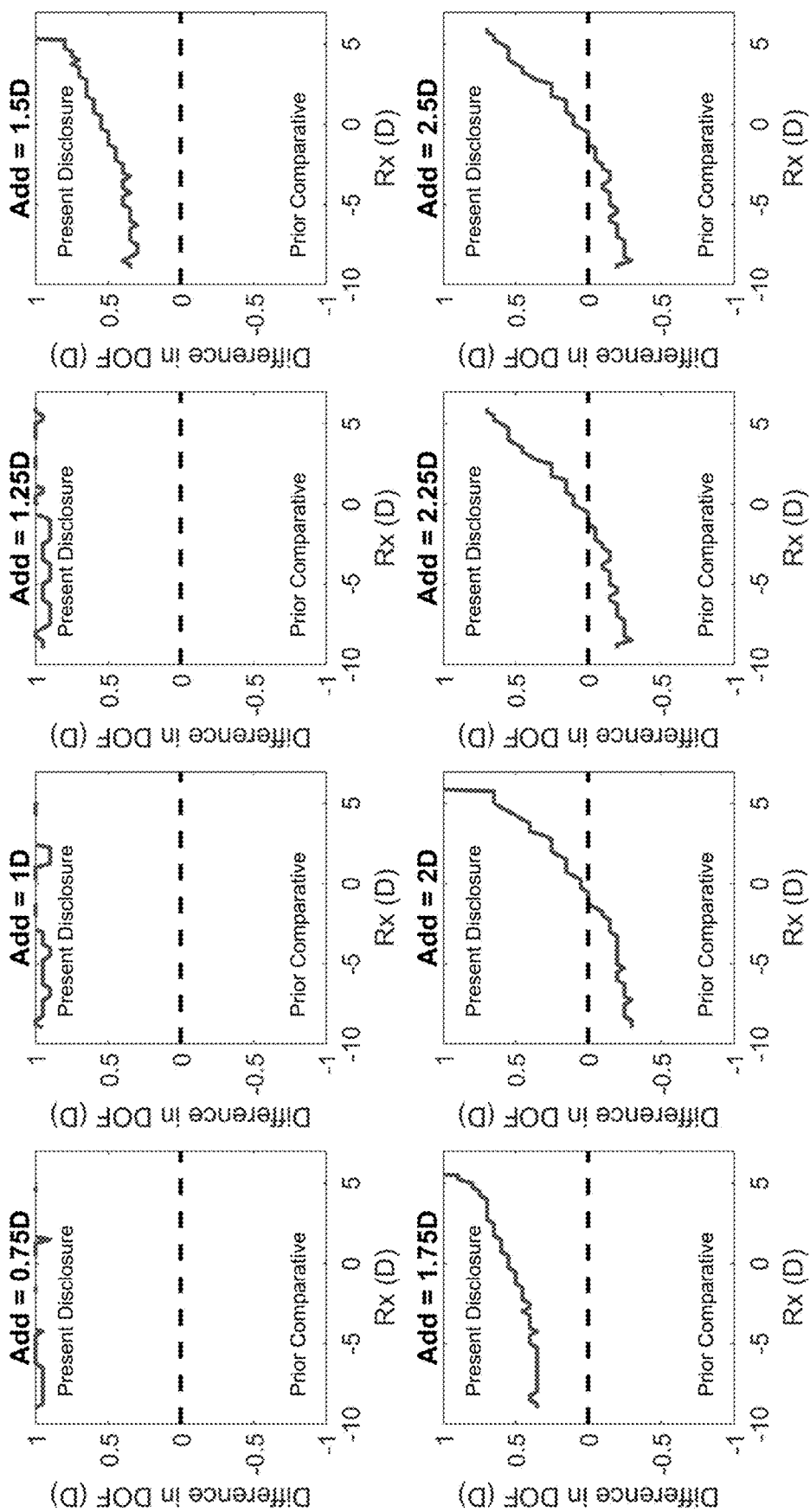
FIG. 31 illustrates comparative plots of a difference in depth of focus between the comparative lens system of FIG. 1 and the lens system in accordance with the present disclosure, an example of which is shown in FIG. 10, for a non-dominant eye in low luminance (luminance=2 cd/m$^2$) across various Add powers. The dashed line is a reference representing zero difference, below the line indicates a greater DOF for prior art lenses such as shown in FIG. 1 and above the line indicates a greater effective add for lenses in accordance to the present disclosure such as shown in FIG. 10.

FIG. 29 illustrates a comparison of the effective add for various Add powers for a non-dominant eye in dim light conditions between the conventional lenses/lens systems (MF) and a lens system in accordance with the present disclosure. FIG. 31 illustrates a comparison of the DOF for various Add powers for a non-dominant eye in dim light conditions between the conventional lenses/lens systems (MF) and a lens system in accordance with the present disclosure. In dim light conditions, the example lens system of the present disclosure uses more effective add in the non-dominant eye for the mid and high adds. The example lens system of the present disclosure uses more DOF in the low and mid add, and MF uses more DOF in high add myopes while the example lens system of the present disclosure uses more DOF in high add hyperopes.

Figure 32:
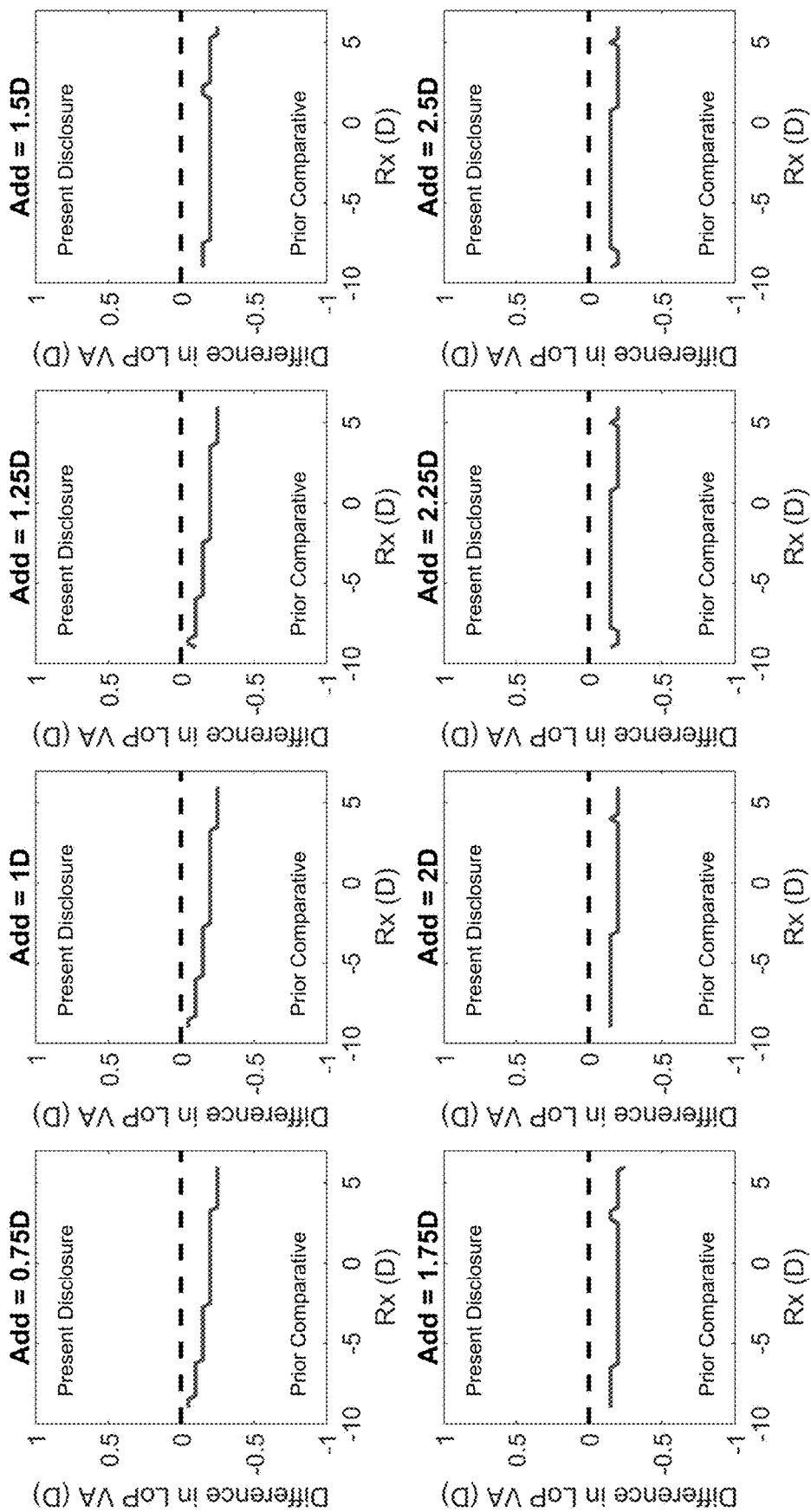
FIG. 32 illustrates comparative plots of a difference in location of peak visual acuity between the comparative lens system of FIG. 1 and the lens system in accordance with the present disclosure, an example of which is shown in FIG. 10, for a dominant eye in mid luminance (luminance=20 cd/m$^2$)

FIG. 32 illustrates a comparison of the effective add for various Add powers for a dominant eye in moderate light conditions between the conventional lenses/lens systems (MF) and a lens system in accordance with the present disclosure. FIG. 34 illustrates a comparison of the DOF for various Add powers for a dominant eye in moderate light conditions between the conventional lenses/lens systems (MF) and a lens system in accordance with the present disclosure. In moderate light conditions, MF uses more effective add in the dominant eye.

FIG. 33 illustrates a comparison of the effective add for various Add powers for a non-dominant eye in moderate light conditions between the conventional lenses/lens systems (MF) and a lens system in accordance with the present disclosure. FIG. 35 illustrates a comparison of the DOF for various Add powers for a non-dominant eye in moderate light conditions between the conventional lenses/lens systems (MF) and a lens system in accordance with the present disclosure. In moderate light conditions, the example lens system of the present disclosure uses more effective add in the non-dominant eye and more DOF in the low and mid add.

FIG. 36 illustrates a comparison of the effective add for various Add powers for a dominant eye in bright light conditions between the conventional lenses/lens systems (MF) and a lens system in accordance with the present disclosure. FIG. 38 illustrates a comparison of the DOF for various Add powers for a dominant eye in bright light conditions between the conventional lenses/lens systems (MF) and a lens system in accordance with the present disclosure. In bright light conditions, MF uses more effective add in the dominant eye.

FIG. 37 illustrates a comparison of the effective add for various Add powers for a non-dominant eye in bright light conditions between the conventional lenses/lens systems (MF) and a lens system in accordance with the present disclosure. FIG. 39 illustrates a comparison of the DOF for various Add powers for a non-dominant eye in bright light conditions between the conventional lenses/lens systems (MF) and a lens system in accordance with the present disclosure. In bright light conditions, the example lens system of the present disclosure uses more effective add in the non-dominant eye in the low and mid add.

As illustrated, simulations indicate that the example lens system of the present disclosure provides comparable or superior distance and near performance and sacrifices a bit of intermediate performance in low light when compared to MF. In general, the example lens system of the present disclosure uses more effective add and provides more DOF in the non-dominant eye, while MF uses more effective add and the example lens system of the present disclosure provides more DOF in the dominant eye. However, in bright conditions where the pupil is small, cyclopean DOF with both designs are equivalent. Although the increased DOF of the example lens system of the present disclosure may be significant in low light conditions, the predominant difference between the two systems (from dim to bright light) is due to differences in the effective add. Therefore, the example lens system of the present disclosure improves through-focus cyclopean visual performance by optimally leveraging the visual system's tolerance of interocular disparity of effective add.

EXAMPLES

Power Profiles and Visual Performance Manifolds

For each design simulated, the power profiles of each lens in the lens system were plotted for refractive errors of −9, −6, −3, 2, 4 and 6 D, and the visual performance manifold is presented. The fit guide is presented in tabular form for each design. The fit guide includes information about the lens design and the fit for both the dominant and non-dominant eyes. The fit is the difference between the power label of the fitted lens and the subject's refraction. Visual performance is gray-level coded in units of −10 log MAR from −2 to 0.5. Values above 0.5 saturate and remain dark gray while values below −2 saturate and are displayed as white.

Multifocal (MF)

|  | Add Need (D) | | | | | | | |
| --- | --- | --- | --- | --- | --- | --- | --- | --- |
|  | 0.75 | 1 | 1.25 | 1.5 | 1.75 | 2 | 2.25 | 2.5 |
| Dominant | lensA (MF_A) | lensA (MF_A) | lensA (MF_A) | lensB (MF_B) | lensB (MF_B) | lensB (MF_B) | lensB (MF_B) | lensB (MF_B) |
| Non-Dominant | lensA (MF_A) | lensA (MF_A) | lensA (MF_A) | lensB (MF_B) | lensB (MF_B) | lensC (MF_C) | lensC (MF_C) | lensC (MF_C) |

Example Lens System of the Present Disclosure

|  | Add Need (D) | | | | | | | |
|---|---|---|---|---|---|---|---|---|
|  | 0.75 | 1 | 1.25 | 1.5 | 1.75 | 2 | 2.25 | 2.5 |
| Dominant | lensA | lensA | lensA | lensB | lensB | lensB | lensB | lensB |
| Non-Dominant | lensB | lensB | lensB | lensC | lensC | lensC | lensC | lensC |
|  |  |  |  |  | +0.25 | +0.25 | +0.25 | +0.25 |

FIG. 10: Power profile of the 3 lens designs of an example lens system of the present disclosure.

Figure 11:
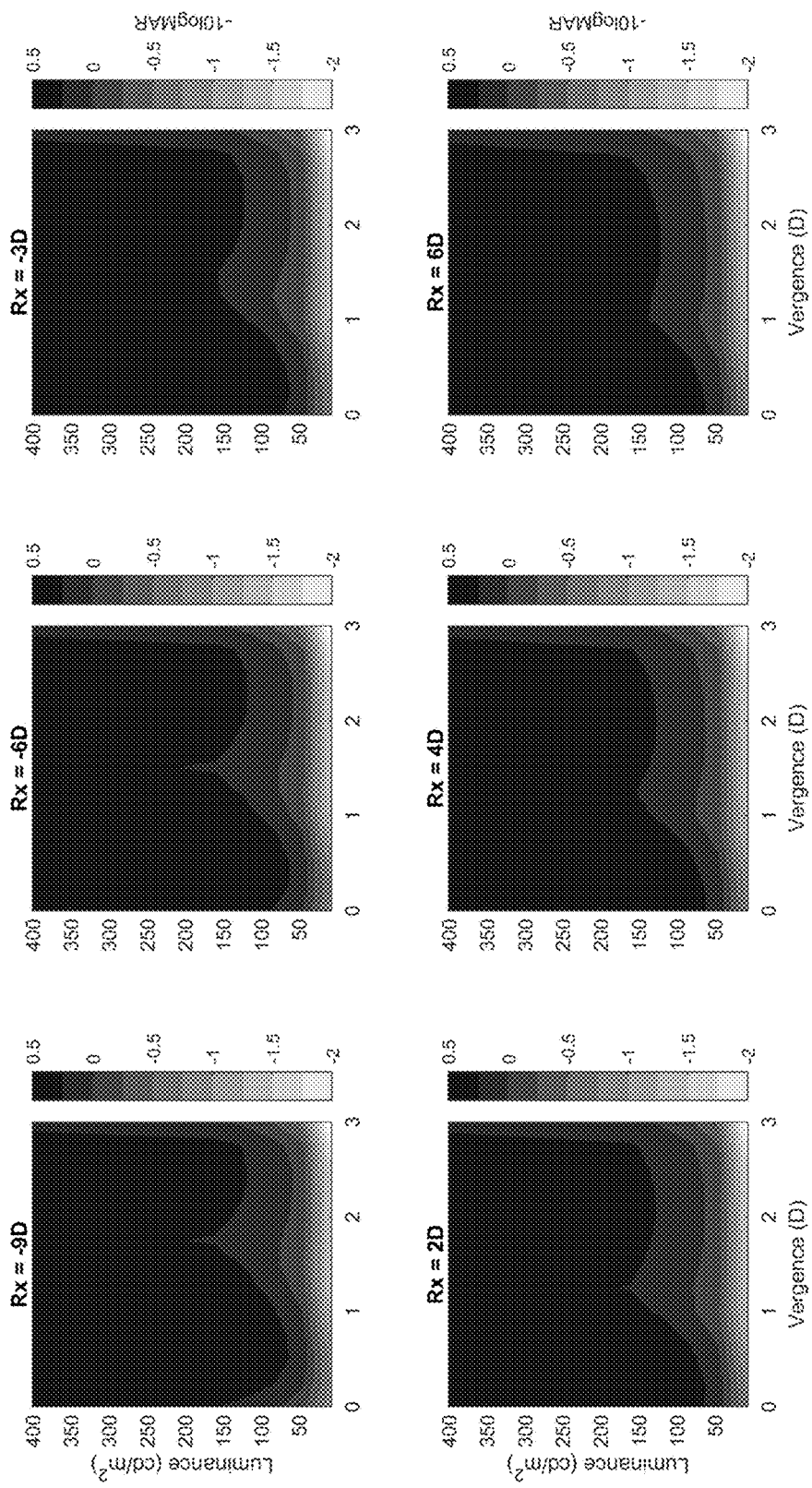
FIG. 11 shows example graphs of visual performance of a lens system in accordance with the present disclosure for various prescriptions (Rx) and an Add of 0.75 D.

FIG. 11: Visual performance manifold of an example lens system of the present disclosure for an add need of 0.75 D.

Figure 12:
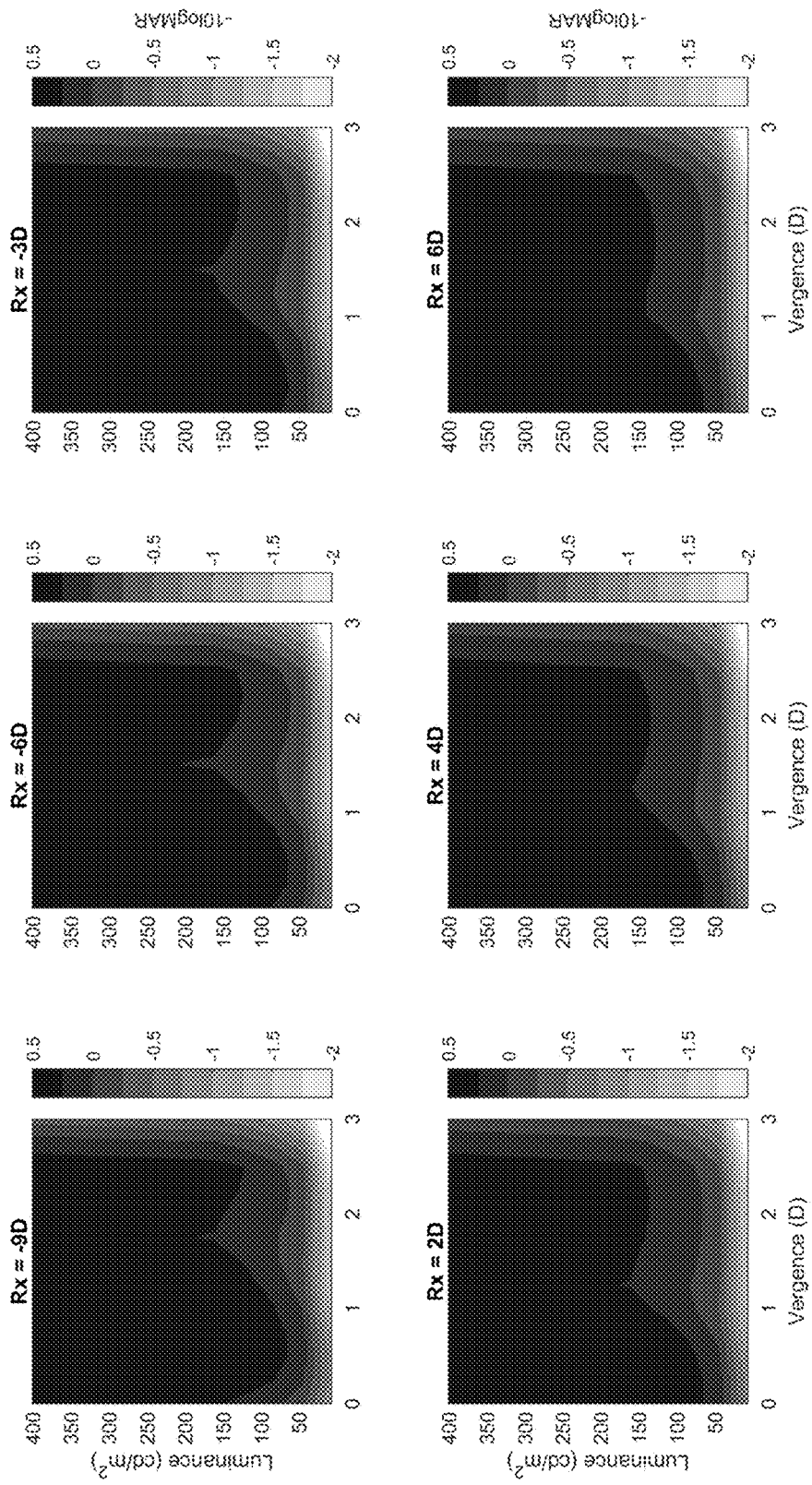
FIG. 12 shows example graphs of visual performance of a lens system in accordance with the present disclosure for various prescriptions (Rx) and an Add of 1.00 D.

FIG. 12: Visual performance manifold of an example lens system of the present disclosure for an add need of 1 D.

Figure 13:
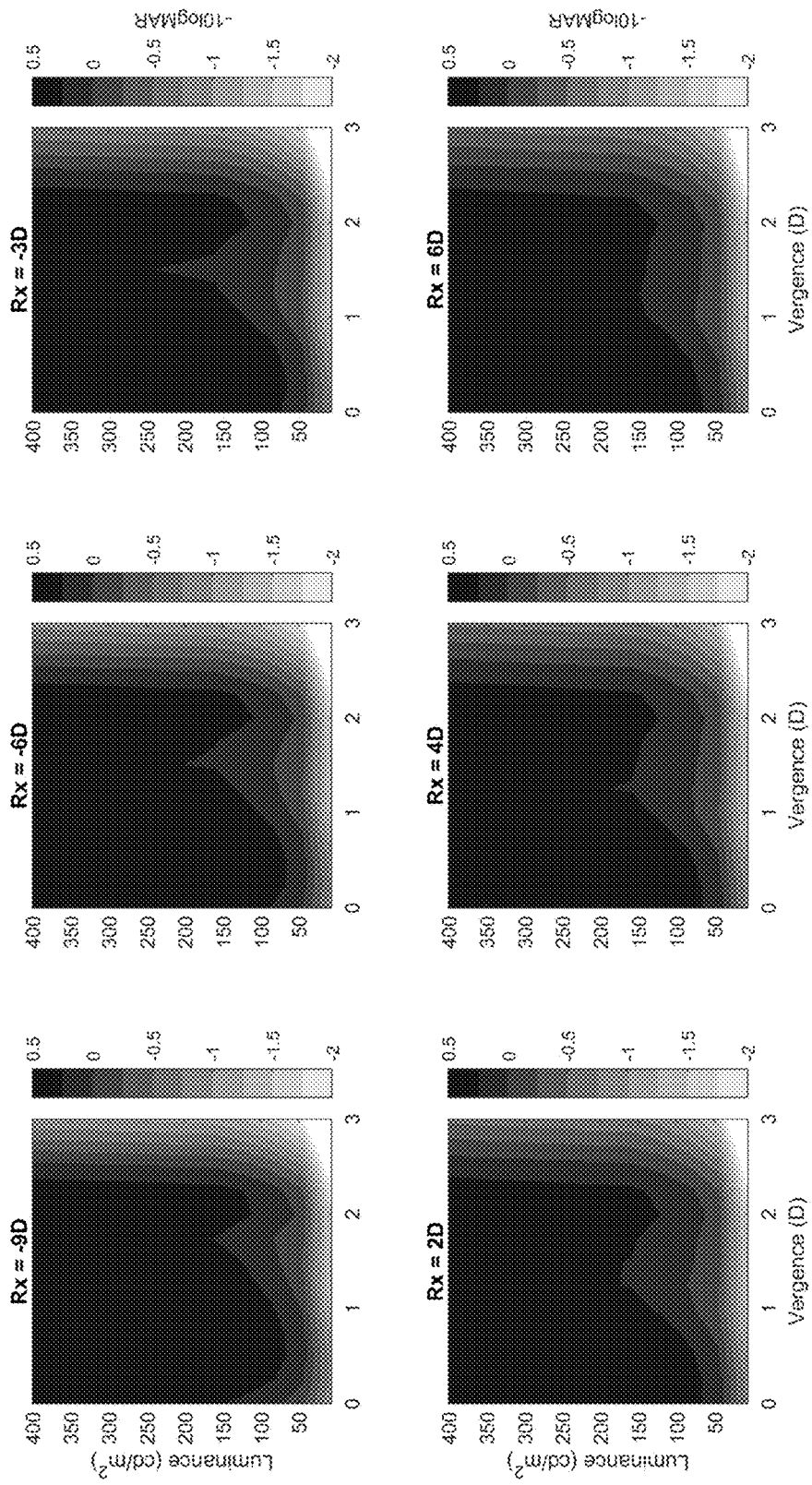
FIG. 13 shows example graphs of visual performance of a lens system in accordance with the present disclosure for various prescriptions (Rx) and an Add of 1.25 D.

FIG. 13: Visual performance manifold of an example lens system of the present disclosure for an add need of 1.25 D.

Figure 14:
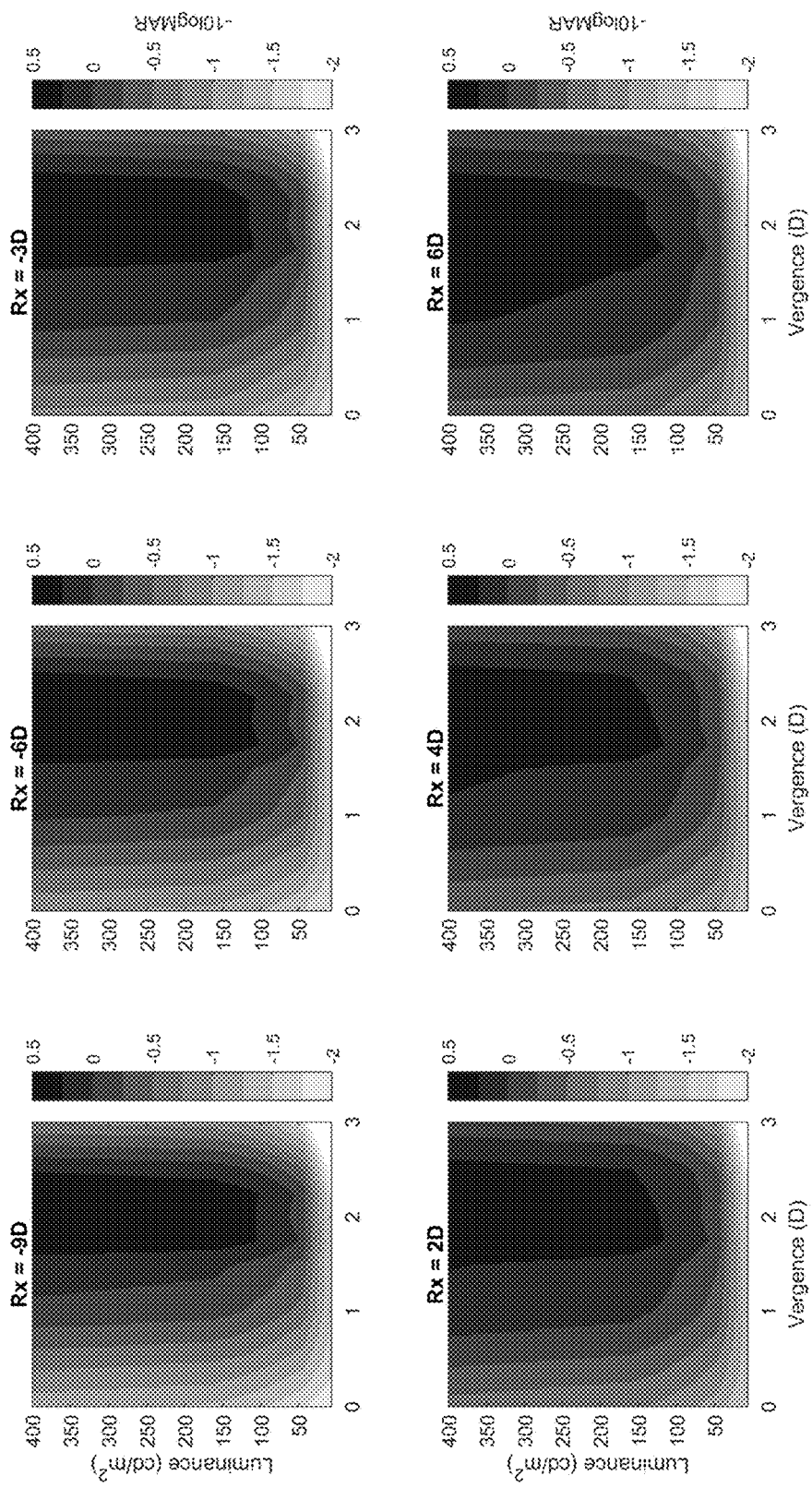
FIG. 14 shows example graphs of visual performance of a lens system in accordance with the present disclosure for various prescriptions (Rx) and an Add of 1.50 D.

FIG. 14: Visual performance manifold of an example lens system of the present disclosure for an add need of 1.5 D.

Figure 15:
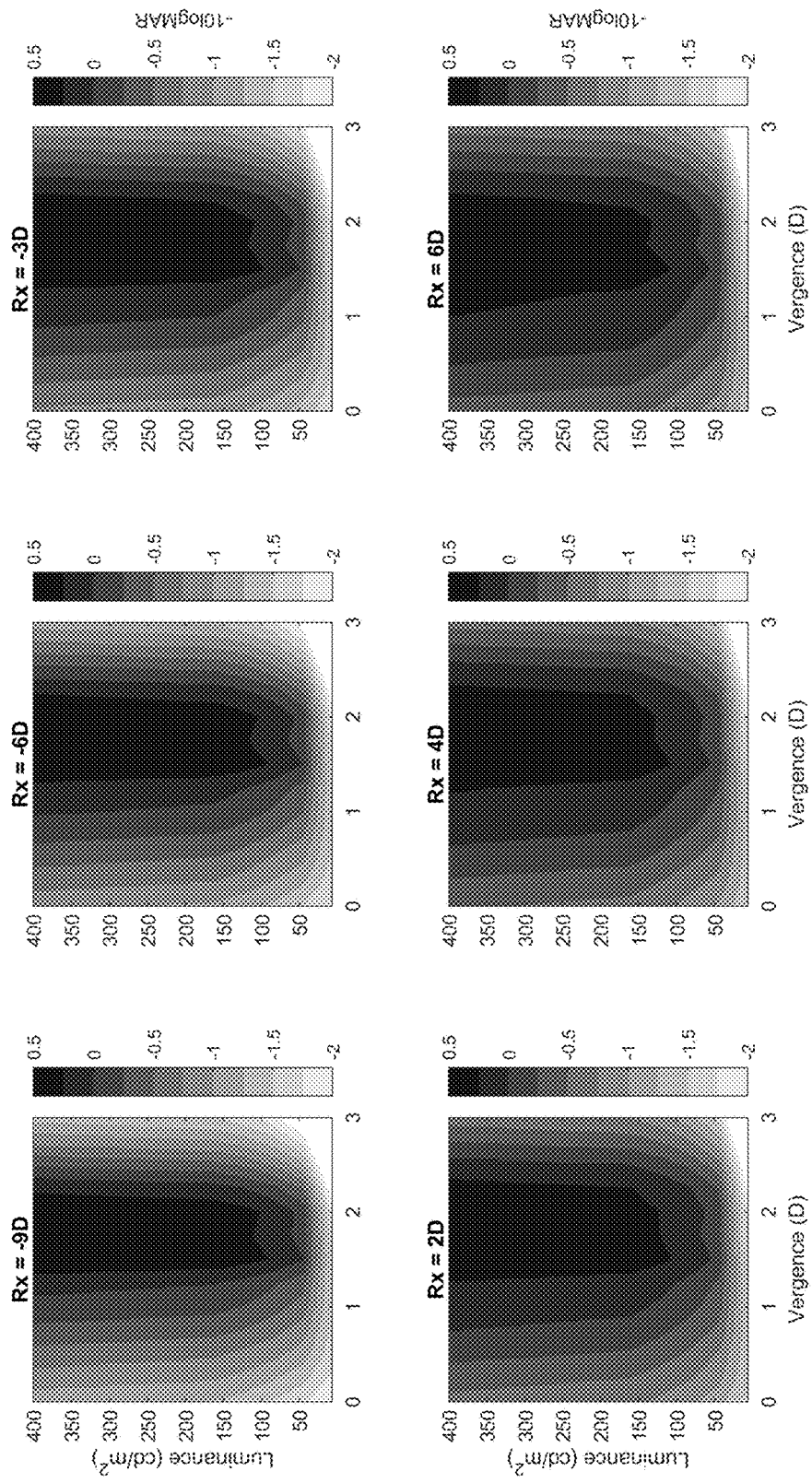
FIG. 15 shows example graphs of visual performance of a lens system in accordance with the present disclosure for various prescriptions (Rx) and an Add of 1.75 D.

FIG. 15: Visual performance manifold of an example lens system of the present disclosure for an add need of 1.75 D.

Figure 16:
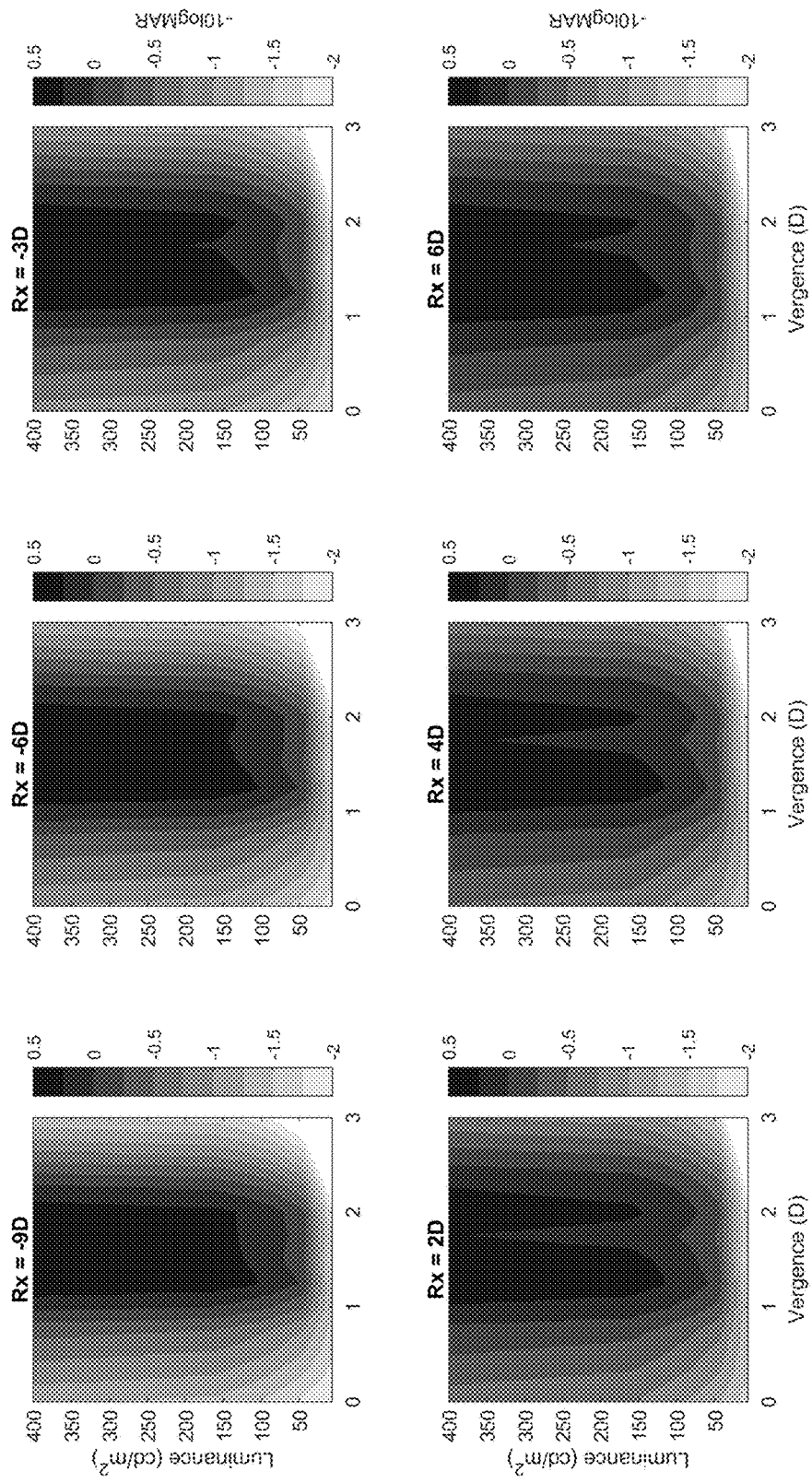
FIG. 16 shows example graphs of visual performance of a lens system in accordance with the present disclosure for various prescriptions (Rx) and an Add of 2.0 D.

FIG. 16: Visual performance manifold of an example lens system of the present disclosure for an add need of 2D.

Figure 17:
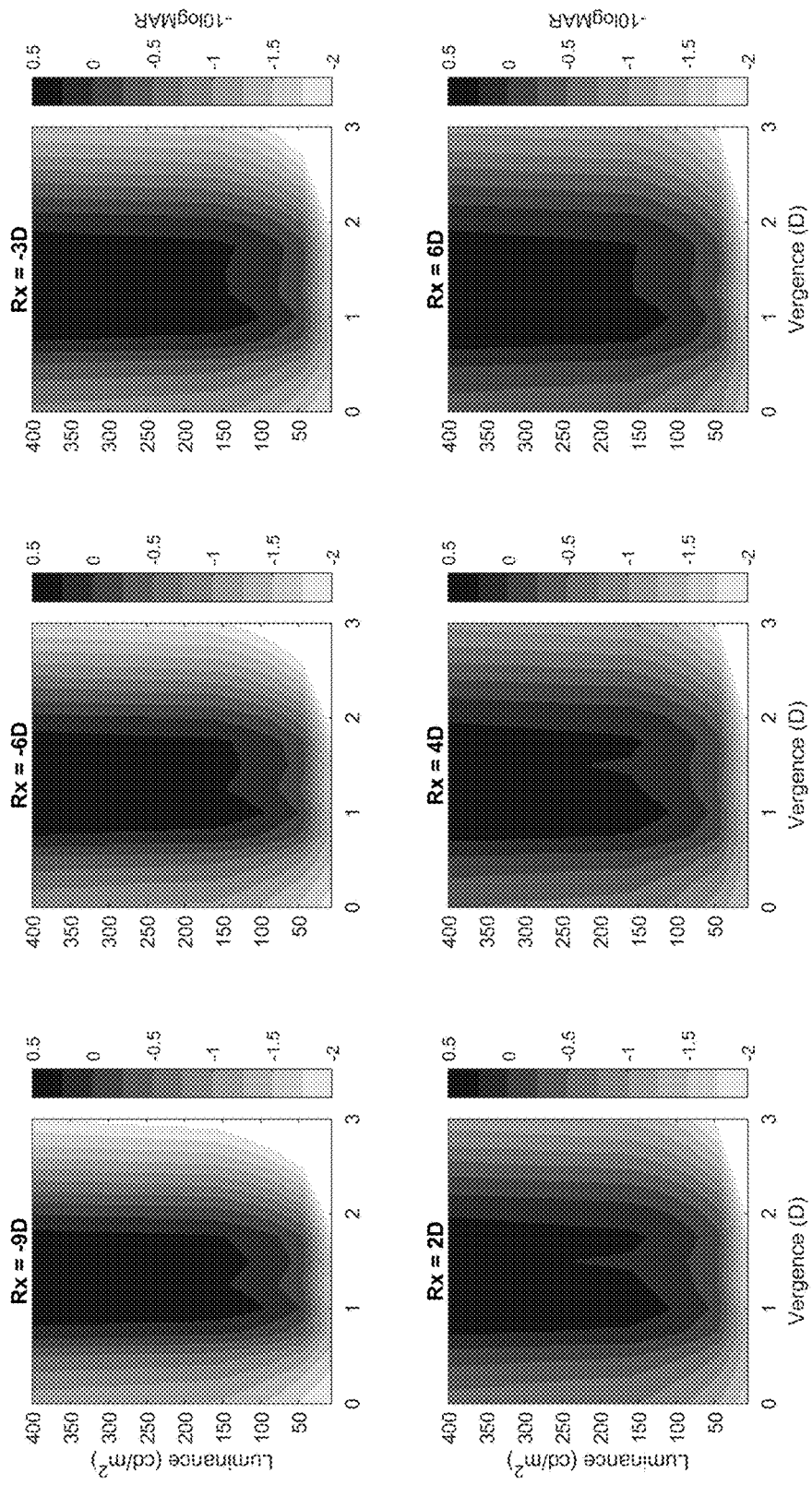
FIG. 17 shows example graphs of visual performance of a lens system in accordance with the present disclosure for various prescriptions (Rx) and an Add of 2.25 D.

FIG. 17: Visual performance manifold of an example lens system of the present disclosure for an add need of 2.25 D.

Figure 18:
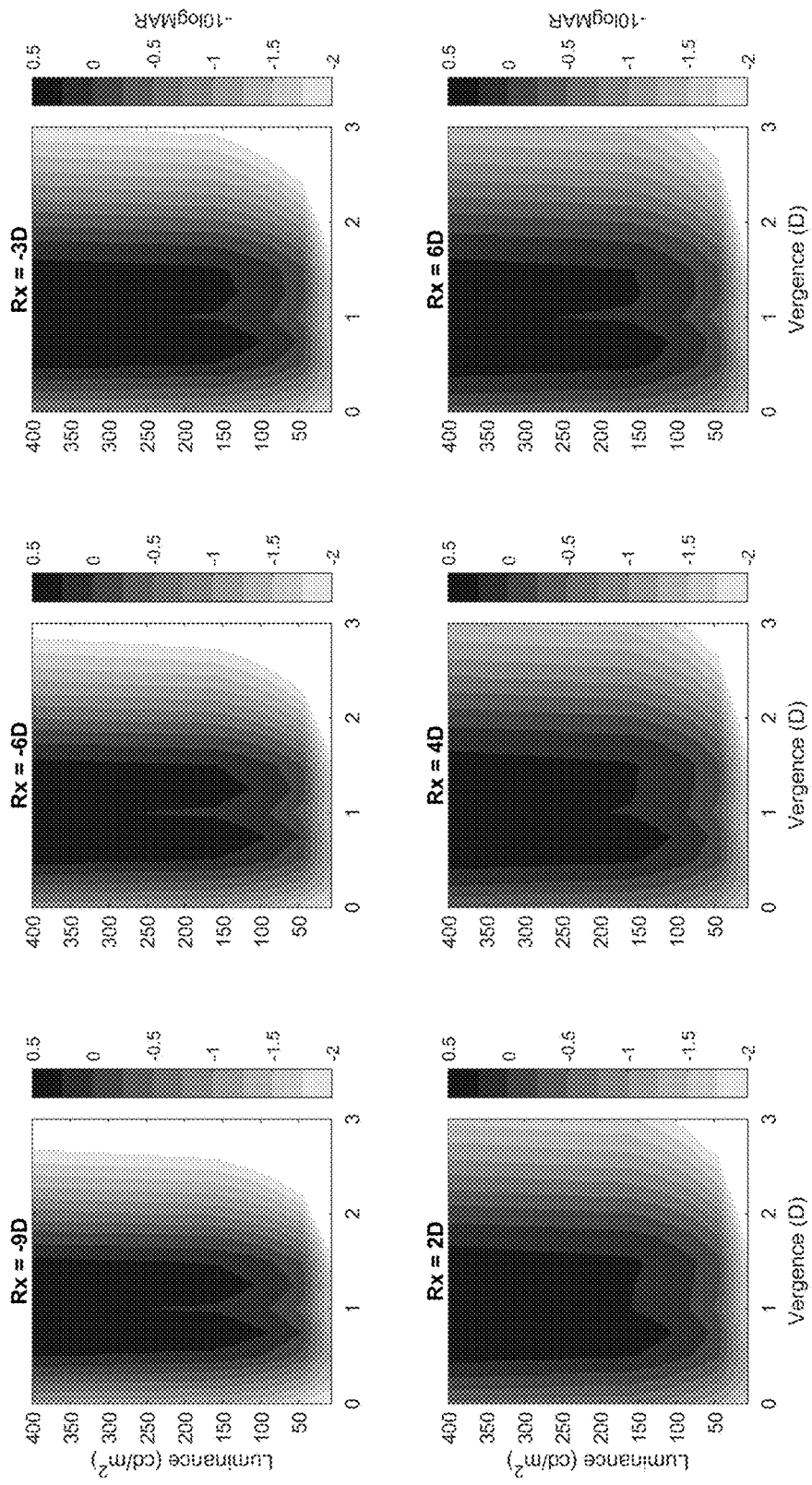
FIG. 18 shows example graphs of visual performance of a lens system in accordance with the present disclosure for various prescriptions (Rx) and an Add of 2.5 D.

FIG. 18: Visual performance manifold of an example lens system of the present disclosure for an add need of 2.5 D.

Although shown and described in what is believed to be the most practical and preferred embodiments, it is apparent that departures from specific designs and methods described and shown will suggest themselves to those skilled in the art and may be used without departing from the spirit and scope of the disclosure. The present disclosure is not restricted to the particular constructions described and illustrated but should be constructed to cohere with all modifications that may fall within the scope of the appended claims.

What is claimed is:

1. A method for fitting a presbyopic patient with first and second contact lenses selected from a system of contact lenses, the method comprising the steps of:
   determining a plurality of lens types for inclusion in a system of contact lenses for treating presbyopes, wherein the lens system comprises at least three lens types (lens A, a lens B, and a lens C designation),
   wherein each of the plurality of lenses is configured for an optical correction and has a power profile associated therewith,
   wherein the plurality of lenses are grouped based on the optical correction and wherein each of the lenses of a particular type has a different power profile;
   determining a fit profile for said patient determined at least based on a refractive and a cylinder corrective need of said patient, an ADD power need of said patient, and an effective ADD of said paitent;
   simulating, based on said fit profile, one or more visual performance manifolds, wherein each visual performance manifold is generated based at least on lens designs of said plurality of lens types, an eye model, and environmental conditions;
   generating a customized fit guide for said patient for said plurality of lens types, wherein said customized fit guide is based at least on said fit profile of said patient, and interocular disparity of effective ADD of said patient; and
   selecting said fits and second contact lenses for said patient based on said generated fit guide.

2. The method of claim 1, wherein each lens group comprises at least three center-near continuous multifocal lenses.

3. The method of claim 1, wherein each group of lenses comprises three lenses.

4. The method of claim 1, wherein each group of lenses comprises four lenses.

5. The method of claim 1, wherein each group of lenses comprises five lenses.

6. The method of claim 1, wherein the optical correction is between −20 D and +20 D.

7. The method of claim 1, wherein determining a plurality of lens groups comprises determining a visual performance manifold for one or more of the lenses in the plurality of lens groups.

8. The method of claim 1, wherein the fit guide comprises one or more of:

|  | Add Need (D) | | | | | | | |
|---|---|---|---|---|---|---|---|---|
|  | 0.75 | 1 | 1.25 | 1.5 | 1.75 | 2 | 2.25 | 2.5 |
| Dominant | lensA | lensA | lensA | lensB | lensB | lensB | lensB | lensB |
| Non-Dominant | lensB | lensB | lensB | lensC | lensC | lensC | lensC | lensC |
|  |  |  |  |  | +0.25 | +0.25 | +0.25 | +0.25 |

|  | Add Need (D) | | | | | | | |
|---|---|---|---|---|---|---|---|---|
|  | 0.75 | 1 | 1.25 | 1.5 | 1.75 | 2 | 2.25 | 2.5 |
| Dominant | lensA | lensA | lensA | lensB | lensB | lensB | lensB | lensB |
| Non-Dominant | lensB | lensB | lensB | lensC | lensC | lensC | lensC | lensC |
|  |  |  |  |  |  | +0.25D | +0.25D | +0.25D |

|  | Add Need (D) | | | | | | | |
|---|---|---|---|---|---|---|---|---|
|  | 0.75 | 1 | 1.25 | 1.5 | 1.75 | 2 | 2.25 | 2.5 |
| Dominant | lensA | lensA | lensA | lensB | lensB | lensB | lensB | lensB |
| Non-Dominant | lensB | lensB | lensB | lensB | lensB | lensB | lensB | lensB |
|  | −0.25D | −0.25D | −0.25D | +0.25D | +0.25D | +0.50D | +0.50D | +0.50D |

| | Add Need (D) | | | | | | | |
|---|---|---|---|---|---|---|---|---|
| | 0.75 | 1 | 1.25 | 1.5 | 1.75 | 2 | 2.25 | 2.5 |
| Dominant | lensA | lensA | lensA | lensB | lensB | lensB | lensB | lensB |
| Non-Dominant | lensB +0.25D | lensB +0.25D | lensB +0.25D | lensC +0.25D | lensC +0.25D | lensC +0.50D | lensC +0.50D | lensC +0.50D |

| | Add Need (D) | | | | | | | |
|---|---|---|---|---|---|---|---|---|
| | 0.75 | 1 | 1.25 | 1.5 | 1.75 | 2 | 2.25 | 2.5 |
| Dominant | lensA | lensA | lensA | lensB | lensB | lensB | lensB | lensB |
| Non-Dominant | lensA +0.25D | lensA +0.25D | lensA +0.25D | lensC −0.25D | lensC −0.25D | lensC | lensC | lensC |

| | Add Need (D) | | | | | | | |
|---|---|---|---|---|---|---|---|---|
| | 0.75 | 1 | 1.25 | 1.5 | 1.75 | 2 | 2.25 | 2.5 |
| Dominant | lensB −0.25D | lensB −0.25D | lensB −0.25D | lensC −0.25D | lensC −0.25D | lensC −0.25D | lensC −0.25D | lensC −0.25D |
| Non-Dominant | lensB | lensB | lensB | lensC | lensC | lensC +0.25D | lensC +0.25D | lensC +0.25D. |

9. A system of fitting a presbyopic patient with contact lenses with interocular disparity for presbyopes, the system comprising:
a plurality of lens types for treating presbyopes, wherein the lens system comprises at least three lens types (lens A, a lens B, and a lens C designation),
wherein each of the plurality of lenses is configured for an optical correction and has a power profile associated therewith,
wherein the plurality of lenses is grouped based on the optical correction and wherein each of the lenses of a particular type has a different power profile,
a fit guide indicating which of the plurality of lenses is to be worn on a dominant eye and a non-dominant eye, wherein the fit guide created by:
determining, based on at least a refractive and a cylinder corrective need of said patient, a fit profile for said patient, an ADD power need of said patient, and an effective ADD of said patient; and
simulating, based on at least said fit profile, one or more visual performance manifolds, wherein each visual performance manifold is simulated based at least on lens designs of said plurality of lens types, an eye model, and environmental conditions, wherein the fit guide comprises a customized fit guide generated for said presbyopic patient for said plurality of lens types, wherein said customized fit is based at least on said fit profile of said patient, and interocular disparity of effective ADD of said patient; and wherein the system is further configured to select first and second contact lenses for said presbyopic patient based on said generated customized fit guide.

10. The system of claim 9, wherein each lens group comprises at least three center near continuous multifocal lenses.

11. The system of claim 9, wherein each group of lenses comprises three lenses.

12. The system of claim 9, wherein each group of lenses comprises four lenses.

13. The system of claim 9, wherein each group of lenses comprises five lenses.

14. The system of claim 9, wherein the power profile is between −20 D and +20 D.

15. The system of claim 9, wherein the fit guide is dependent on a visual performance manifold for one or more of the lenses in the plurality of lens groups.

16. The method of claim 9, wherein the fit guide comprises one or more of:

| | Add Need (D) | | | | | | | |
|---|---|---|---|---|---|---|---|---|
| | 0.75 | 1 | 1.25 | 1.5 | 1.75 | 2 | 2.25 | 2.5 |
| Dominant | lensA | lensA | lensA | lensB | lensB | lensB | lensB | lensB |
| Non-Dominant | lensB | lensB | lensB | lensC | lensC +0.25 | lensC +0.25 | lensC +0.25 | lensC +0.25 |

|  | Add Need (D) | | | | | | | |
| --- | --- | --- | --- | --- | --- | --- | --- | --- |
|  | 0.75 | 1 | 1.25 | 1.5 | 1.75 | 2 | 2.25 | 2.5 |
| Dominant | lensA | lensA | lensA | lensB | lensB | lensB | lensB | lensB |
| Non-Dominant | lensB | lensB | lensB | lensC | lensC | lensC +0.25D | lensC +0.25D | lensC +0.25D |

|  | Add Need (D) | | | | | | | |
| --- | --- | --- | --- | --- | --- | --- | --- | --- |
|  | 0.75 | 1 | 1.25 | 1.5 | 1.75 | 2 | 2.25 | 2.5 |
| Dominant | lensA | lensA | lensA | lensB | lensB | lensB | lensB | lensB |
| Non-Dominant | lensB −0.25D | lensB −0.25D | lensB −0.25D | lensB +0.25D | lensB +0.25D | lensB +0.50D | lensB +0.50D | lensB +0.50D |

|  | Add Need (D) | | | | | | | |
| --- | --- | --- | --- | --- | --- | --- | --- | --- |
|  | 0.75 | 1 | 1.25 | 1.5 | 1.75 | 2 | 2.25 | 2.5 |
| Dominant | lensA | lensA | lensA | lensB | lensB | lensB | lensB | lensB |
| Non-Dominant | lensB +0.25D | lensB +0.25D | lensB +0.25D | lensC +0.25D | lensC +0.25D | lensC +0.50D | lensC +0.50D | lensC +0.50D |

|  | Add Need (D) | | | | | | | |
| --- | --- | --- | --- | --- | --- | --- | --- | --- |
|  | 0.75 | 1 | 1.25 | 1.5 | 1.75 | 2 | 2.25 | 2.5 |
| Dominant | lensA | lensA | lensA | lensB | lensB | lensB | lensB | lensB |
| Non-Dominant | lensA +0.25D | lensA +0.25D | lensA +0.25D | lensC −0.25D | lensC −0.25D | lensC | lensC | lensC |

|  | Add Need (D) | | | | | | | |
| --- | --- | --- | --- | --- | --- | --- | --- | --- |
|  | 0.75 | 1 | 1.25 | 1.5 | 1.75 | 2 | 2.25 | 2.5 |
| Dominant | lensB −0.25D | lensB −0.25D | lensB −0.25D | lensC −0.25D | lensC −0.25D | lensC −0.25D | lensC −0.25D | lensC −0.25D |
| Non-Dominant | lensB | lensB | lensB | lensC | lensC | lensC +0.25D | lensC +0.25D | lensC +0.25D. |

\* \* \* \* \*